United States Patent
Kendall et al.

(10) Patent No.: US 10,675,618 B2
(45) Date of Patent: Jun. 9, 2020

(54) INTEGRATION OF EX SITU FABRICATED POROUS POLYMER MONOLITHS INTO FLUIDIC CHIPS

(71) Applicant: University of Maryland, College Park, College Park, MD (US)

(72) Inventors: Eric L. Kendall, College Park, MD (US); Erik Wienhold, College Park, MD (US); Omid Rahmanian, College Park, MD (US); Don L. Devoe, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 481 days.

(21) Appl. No.: 14/671,250

(22) Filed: Mar. 27, 2015

(65) Prior Publication Data

US 2015/0321191 A1 Nov. 12, 2015

Related U.S. Application Data

(60) Provisional application No. 61/971,107, filed on Mar. 27, 2014, provisional application No. 61/971,091, filed on Mar. 27, 2014.

(51) Int. Cl.
*B01J 19/24* (2006.01)
*B01L 3/00* (2006.01)
(Continued)

(52) U.S. Cl.
CPC ......... *B01L 3/5023* (2013.01); *B01J 19/2485* (2013.01); *B01L 3/502* (2013.01);
(Continued)

(58) Field of Classification Search
CPC ..... C08J 9/36; C08J 9/286; C08J 9/224; C08J 3/246; C08J 2201/026; C08J 2205/024;
(Continued)

(56) References Cited

U.S. PATENT DOCUMENTS

| 2004/0101442 A1* | 5/2004 | Frechet | ............. | B01L 3/502707 |
|  |  |  |  | 422/506 |
| 2005/0095602 A1* | 5/2005 | West | ............. | B01F 5/061 |
|  |  |  |  | 435/6.19 |

(Continued)

OTHER PUBLICATIONS

Jiang K et al., "A new approach to in-situ "micromanufacturing": microfluidic fabrication . . . using chitosan microparticles as building blocks", Sep. 2011 (Abstract) (Year: 2011).*

(Continued)

*Primary Examiner* — Dean Kwak
(74) *Attorney, Agent, or Firm* — Rothwell, Figg, Ernst Manbeck, P.C.

(57) ABSTRACT

Bare porous polymer monoliths, fluidic chips, methods of incorporating bare porous polymer monoliths into fluidic chips, and methods for functionalizing bare porous polymer monoliths are described. Bare porous polymer monoliths may be fabricated ex situ in a mold. The bare porous polymer monoliths may also be functionalized ex situ. Incorporating the bare preformed porous polymer monoliths into the fluidic chips may include inserting the monoliths into channels of channel substrates of the fluidic chips. Incorporating the bare preformed porous polymer monoliths into the fluidic chips may include bonding a capping layer to the channel substrate. The bare porous polymer monoliths may be mechanically anchored to channel walls and to the capping layer. The bare porous polymer monoliths may be functionalized by ex situ immobilization of capture probes on the monoliths. The monoliths may be functionalized by direct attachment of chitosan.

30 Claims, 14 Drawing Sheets

(51) Int. Cl.
| | |
|---|---|
| C08J 3/24 | (2006.01) |
| C08J 9/224 | (2006.01) |
| C08J 9/36 | (2006.01) |
| C08J 9/28 | (2006.01) |
| C08F 222/10 | (2006.01) |
| C08F 220/32 | (2006.01) |

(52) U.S. Cl.
CPC ... B01L 3/502707 (2013.01); B01L 3/502723 (2013.01); B01L 3/502753 (2013.01); C08J 3/246 (2013.01); C08J 9/224 (2013.01); C08J 9/36 (2013.01); B01D 2253/342 (2013.01); B01J 2219/2402 (2013.01); B01J 2219/2433 (2013.01); B01J 2220/82 (2013.01); B01L 2200/0631 (2013.01); B01L 2200/12 (2013.01); B01L 2300/16 (2013.01); B01L 2300/165 (2013.01); C08F 222/1006 (2013.01); C08F 2220/325 (2013.01); C08J 9/286 (2013.01); C08J 2201/026 (2013.01); C08J 2205/022 (2013.01); C08J 2205/024 (2013.01); C08J 2207/00 (2013.01); C08J 2333/10 (2013.01); C08J 2333/14 (2013.01); C08J 2335/02 (2013.01)

(58) Field of Classification Search
CPC .............. C08J 2207/00; C08J 2205/022; C08J 2333/14; C08J 2333/10; C08J 2335/02; B01L 3/502723; B01L 2200/0631; B01L 2300/165; B01L 3/5027; B01L 2200/12; B01L 2300/16; B01L 3/502; B01L 3/5023; B01L 3/502707; B01L 3/502753; C08F 222/1006; C08F 2220/325
USPC ...................... 422/502–504, 827, 82.08, 527
See application file for complete search history.

(56) References Cited

U.S. PATENT DOCUMENTS

| | | |
|---|---|---|
| 2006/0276108 A1 | 12/2006 | Benson |
| 2007/0054270 A1 | 3/2007 | Inganas et al. |
| 2008/0102478 A1* | 5/2008 | Li ................. B01L 3/5027 435/7.23 |
| 2009/0250347 A1* | 10/2009 | Powell ............ G01N 27/44717 204/549 |
| 2010/0224255 A1 | 9/2010 | Mathies et al. |
| 2013/0277218 A1 | 10/2013 | Mudrik et al. |
| 2014/0178252 A1 | 6/2014 | Hatch et al. |
| 2016/0177382 A1* | 6/2016 | Han ................. G01N 27/44704 506/9 |

OTHER PUBLICATIONS

A. Bhattacharyya et al., "Thermoplastic microfluidic device for on-chip purification of nucleic acids for disposable diagnostics," Anal. Chem., vol. 78, No. 3, pp. 788-92, Feb. 2006, abstract only.
M. C. Breadmore et al., "Microchip-based purification of DNA from biological samples," Anal. Chem., vol. 75, No. 8, pp. 1880-6, Apr. 2003, abstract only.
W. Cao et al., "Chitosan as a polymer for pH-induced DNA capture in a totally aqueous system," Anal. Chem., vol. 78, No. 20, pp. 7222-8, Oct. 2006, abstract only.
K. A. Hagan et al., "Chitosan-coated silica as a solid phase for RNA purification in a microfluidic device," Anal. Chem., vol. 81, No. 13, pp. 5249-56, Jul. 2009, abstract only.
M. He et al., "Parameters governing reproducibility of flow properties of porous monoliths photopatterned within microfluidic channels," Electrophoresis, vol. 31, No. 14, pp. 2422-8, Jul. 2010, abstract only.
Hideaki Hisamoto et al., "Integration of Valving and Sensing on a Capillary-Assembled Microchip," Analytical Chemistry, vol. 77, No. 7, pp. 2266-71, Feb. 11,2005, abstract only.
Natalia V. Ivanova et al., "An inexpensive, automation-friendly protocol for recovering high-quality DNA," Mol. Ecol. Notes, vol. 6, No. 4, pp. 998-1002, Jul. 2006.
L. A. Legendre et al., "A simple, valveless microfluidic sample preparation device for extraction and amplification of DNA from nanoliter-volume samples," Anal. Chem., vol. 78, No. 5, pp. 1444-51, Mar. 2006, abstract only.
Jikun Liu et al., "Polymer Microchips Integrating Solid-Phase Extraction and High-Performance Liquid Chromatography Using Reversed-Phase Polymethacrylate Monoliths," Analytical Chemistry, vol. 81, No. 7, pp. 2545-2554, Mar. 6, 2009, abstract only.
Jikun Liu et al., "Flow-through immunosensors using antibody-immobilized polymer monoliths," Biosensors & Bioelectronics, vol. 26, No. 1, pp. 182-8, Sep. 15, 2010.
Jikun Liu et al., "Nanoparticle-Functionalized Porous Polymer Monolith Detection Elements for Surface-Enhanced Raman Scattering," Analytical Chemistry, vol. 83, No. 6, pp. 2119-24, Mar. 15, 2011.
Madhumita Mahalanabis et al., "Cell lysis and DNA extraction of gram-positive and gram-negative bacteria from whole blood in a disposable microfluidic chip," Lab on a Chip, vol. 9, No. 19, pp. 2811-7, Jun. 29, 2009.
Rangan Mallik et al., "High-Performance Affinity Monolith Chromatography: Development and Evaluation of Human Serum Albumin Columns," Anal. Chem., vol. 76, No. 23, pp. 7013-7022, Nov. 4, 2004, abstract only.
I. Nischang et al., "Advances in the preparation of porous polymer monoliths in capillaries and microfluidic chips with focus on morphological aspects," Analytical and Bioanalytical Chemistry, vol. 397, No. 3, pp. 953-60, Jun. 2010, abstract only.
D. S. Peterson et al., "Enzymatic microreactor-on-a-chip: protein mapping using trypsin immobilized on porous polymer monoliths molded in channels of microfluidic devices," Analytical Chemistry, vol. 74, No. 16, pp. 4081-8, Aug. 2002, abstract only.
Carmen R. Reedy et al., "Solid phase extraction of DNA from biological samples in a post-based, high surface area poly(methyl methacrylate) (PMMA) microdevice," Lab Chip, vol. 11, No. 9, pp. 1603-11, May 7, 2011.
Timothy B. Stachowiak et al., "Fabrication of porous polymer monoliths covalently attached to the walls of channels in plastic microdevices," Electrophoresis, vol. 24, pp. 3689-3693, 2003.
F. Svec, "Porous polymer monoliths: amazingly wide variety of techniques enabling their preparation," Journal of Chromatography A, vol. 1217, No. 6, pp. 902-24, Feb. 5, 2010, abstract only.
M. Vázquez et al., "Review on recent and advanced applications of monoliths and related porous polymer gels in micro-fluidic devices," Anal Chim Acta, vol. 668, No. 2, pp. 100-13, Jun. 4, 2010, abstract only.
J. Wen et al., "DNA extraction using a tetramethyl orthosilicate-grafted photopolymerized monolithic solid phase," Anal. Chem., vol. 78, No. 5, pp. 1673-81, Mar. 1, 2006, abstract only.
Shulin Zeng et al., "Electroosmotic flow pumps with polymer frits," vol. 82, pp. 209-212, 2002.

* cited by examiner

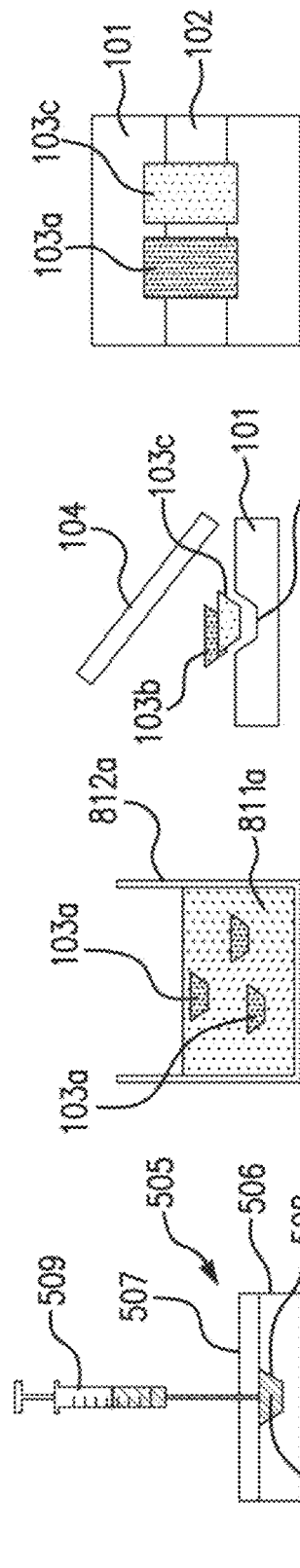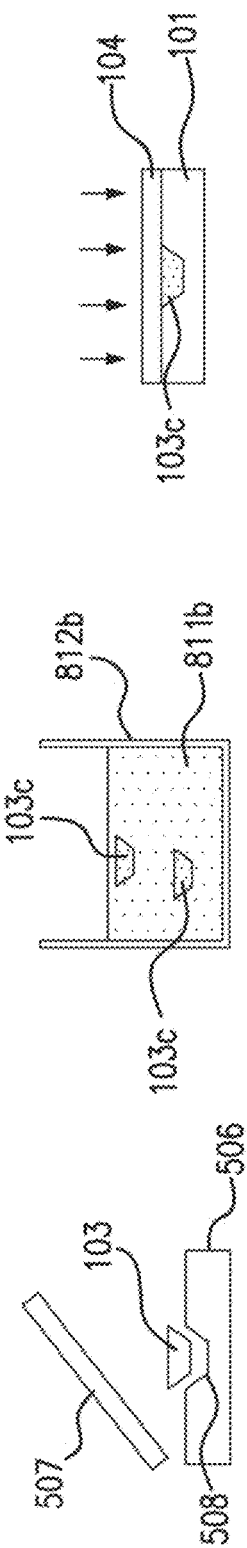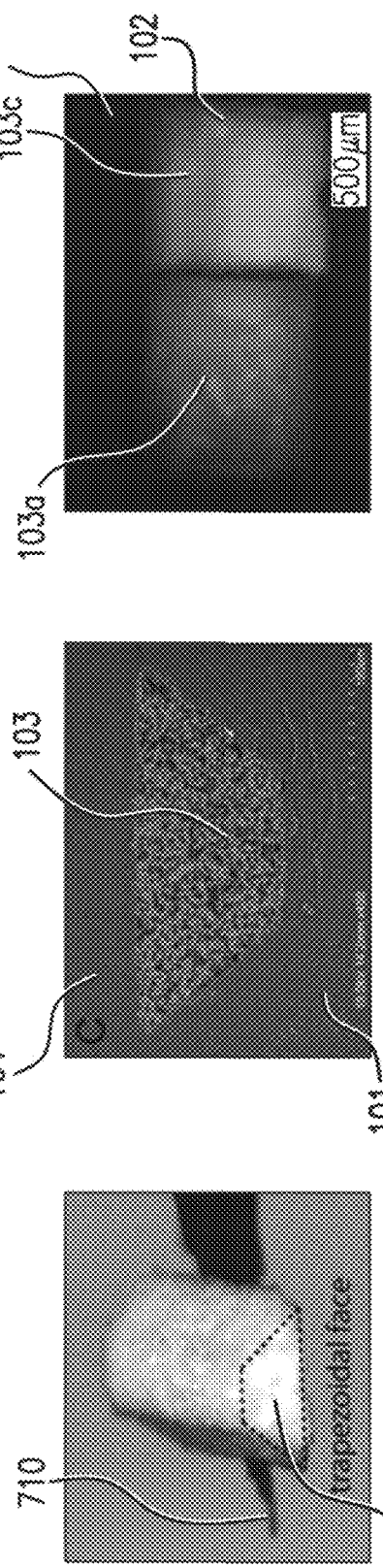

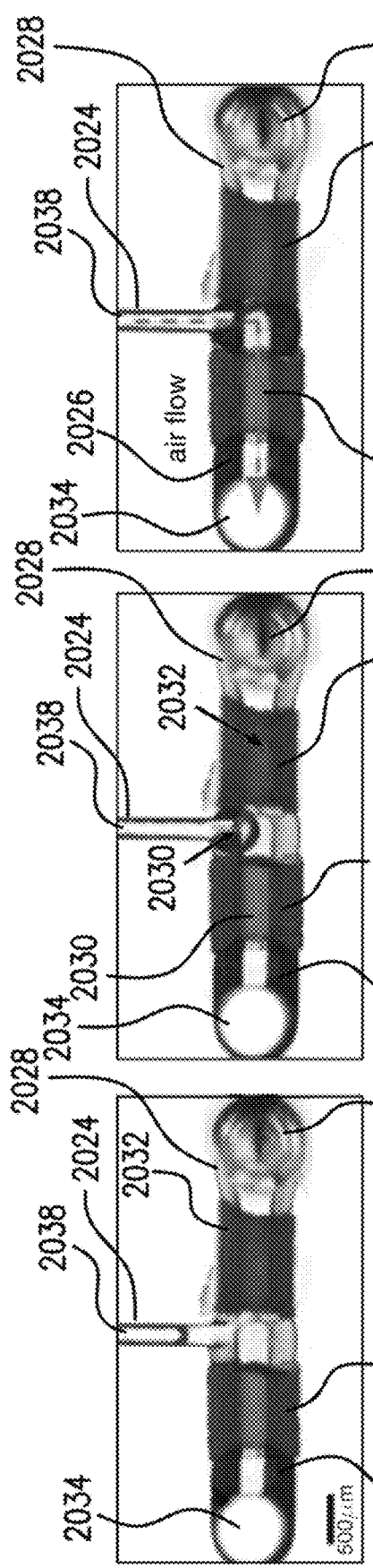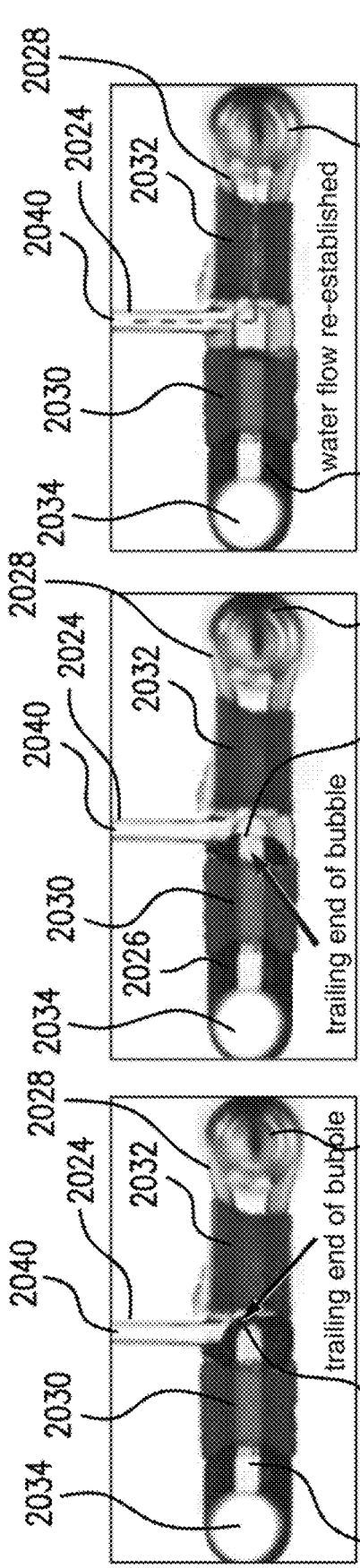
FIG. 20A  FIG. 20B  FIG. 20C
FIG. 20D  FIG. 20E  FIG. 20F

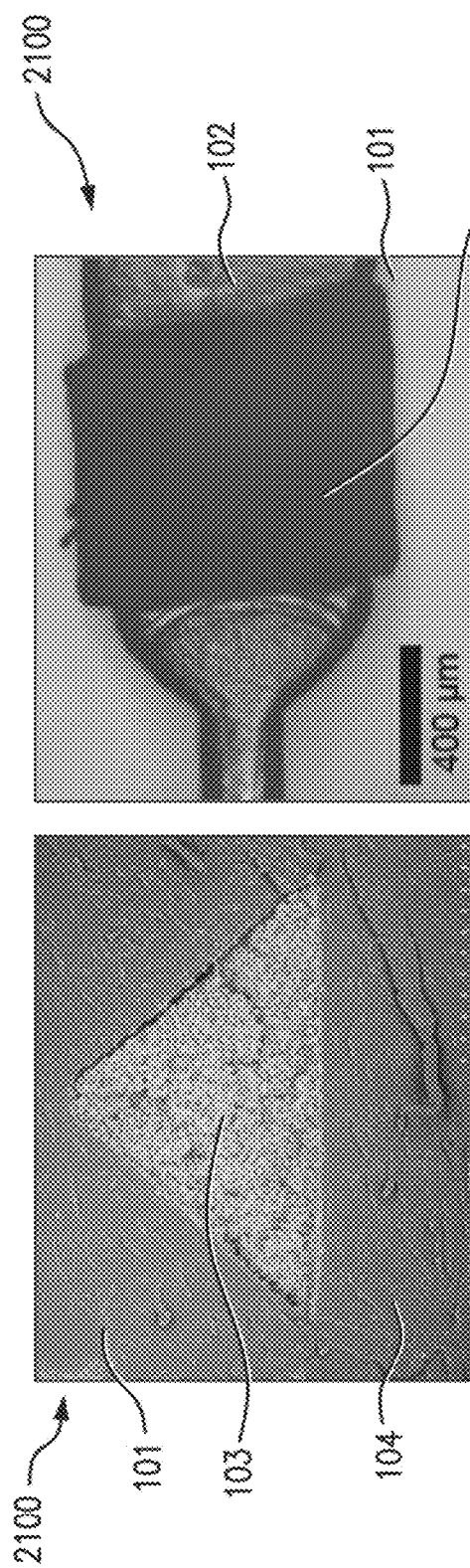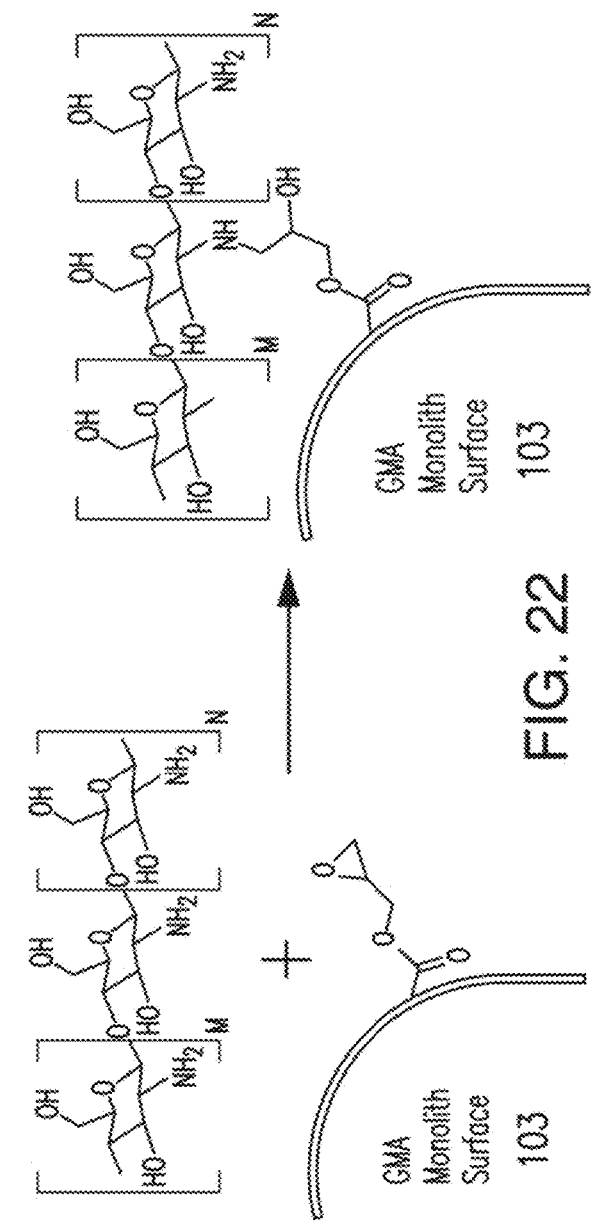
FIG. 21A
FIG. 21B
FIG. 22

INTEGRATION OF EX SITU FABRICATED POROUS POLYMER MONOLITHS INTO FLUIDIC CHIPS

CROSS REFERENCE TO RELATED APPLICATIONS

This application claims the benefit of priority to U.S. Provisional Application Ser. Nos. 61/971,107 and 61/971,091, filed on Mar. 27, 2014, which are incorporated herein by reference in their entireties.

GOVERNMENT LICENSE RIGHTS

This invention was made with government support under Contract No. R01AI096215 awarded by the National Institute of Health and under Contract No. N660011014003 awarded by the Space and Naval Warfare Systems Command. The government has certain rights in the invention.

BACKGROUND

Field of Invention

The present invention relates to fabrication of porous polymer monoliths and integration of one or more porous polymer monoliths into a fluidic chip. More specifically, embodiments of the present invention relate to ex situ fabrication of porous polymer monoliths and integration of one or more porous polymer monoliths into one or more channels of a channel substrate of a fluidic chip.

Discussion of the Background

Polymer monoliths are a diverse class of porous materials that can be synthesized using a wide variety of monomers, crosslinkers, and polymerization techniques. See, e.g., F. Svec, *Porous polymer monoliths: amazingly wide variety of techniques enabling their preparation*, Journal of chromatography. A, vol. 1217, no. 6, pp. 902-24, February 2010. With pore sizes that can be tuned from the scale of hundreds of nanometers to tens of microns, polymer monoliths offer a ready alternative to packed particle beds and have been investigated for preparative and analytical applications where high surface area, controllable pore size, and adaptable surface chemistries are advantageous.

Polymer monoliths have been employed in microfluidic systems in a variety of roles. See, e.g., M. Vázquez and B. Paull, *Review on recent and advanced applications of monoliths and related porous polymer gels in micro-fluidic devices*, Analytica chimica acta, vol. 668, no. 2, pp. 100-13, June 2010. Demonstrated microfluidic applications of porous monoliths include their use as frits for bead packing, cell lysis elements, support scaffolding for micro- and nanoparticles, three dimensional surfaces for antibody and enzyme immobilization, and stationary phases for chromatography or solid phase extraction. See, e.g., S. Zeng et al., *Electroosmotic flow pumps with polymer frits*, vol. 82, pp. 209-212, 2002; M. Mahalanabis, H. Al-Muayad, M. D. Kulinski, D. Altman, and C. M. Klapperich, *Cell lysis and DNA extraction of gram positive and gram-negative bacteria from whole blood in a disposable microfluidic chip*, Lab on a chip, vol. 9, no. 19, pp. 2811-7, October 2009; J. Liu, I. White, and D. L. DeVoe, *Nanoparticle-functionalized porous polymer monolith detection elements for surface-enhanced Raman scattering*, Analytical chemistry, vol. 83, no. 6, pp. 2119-24, March 2011; J. Liu, C.-F. Chen, C.-W. Chang, and D. L. DeVoe, *Flow-through immunosensors using antibody-immobilized polymer monoliths*, Biosensors & bioelectronics, vol. 26, no. 1, pp. 182-8, September 2010; D. S. Peterson, T. Rohr, F. Svec, and J. M. J. Fréchet, *Enzymatic microreactor-on-a-chip: protein mapping using trypsin immobilized on porous polymer monoliths molded in channels of microfluidic devices*, Analytical chemistry, vol. 74, no. 16, pp. 4081-8, August 2002; J. Liu, C.-F. Chen, C.-W. Tsao, C.-C. Chang, C.-C. Chu, and D. L. DeVoe, *Polymer Microchips Integrating Solid-Phase Extraction and High-Performance Liquid Chromatography Using Reversed-Phase Polymethacrylate Monoliths*, Analytical Chemistry, vol. 81, no. 7, pp. 2545-2554, April 2009.

Monolith polymerization reactions take place within a solvent solution where individual precursor species exhibit higher solubility than polymerized reaction products. This differential solubility can be controlled by solvent choice or by tuning the solvent: precursor ratio. These parameters may be selected to adjust the rate at which newly polymerized reaction products phase separate and form solid interconnected globules, thereby providing control over morphology of the resulting monolith.

In conventional microfluidic applications, polymer monoliths are formed in situ at the desired locations within a fully assembled microfluidic chip by ultraviolet (UV) photopolymerization of a precursor solution injected into the channels, allowing photolithographic control over the final monolith dimensions. However, in situ integration presents a number of challenges that limit the potential for monoliths in microfluidic applications.

For example, because the optical mask used during contact photolithography is necessarily displaced from the embedded microchannels by the thickness of the microfluidic cover plate, diffraction of light at the mask edges leads to significant variability in UV dose at the boundaries of the exposed region, resulting in poor control over the resolution of the resulting monoliths. In addition, diffusive transport of prepolymer components during the phase separation and polymerization process results in poor monolith homogeneity at the UV-exposed boundary. In particular, pore size and monolith density may differ drastically at the edges. See, e.g., M. He, J.-B. Bao, Y. Zeng, and D. J. Harrison, *Parameters governing reproducibility of flow properties of porous monoliths photopatterned within microfluidic channels*, Electrophoresis, vol. 31, no. 14, pp. 2422-8, July 2010. The different pore size and monolith density at the edges affect monolith performance for applications such as separations, biosensing, and filtration where uniform pore morphology is critical.

Another constraint that limits the potential of in situ fabricated porous monolith materials for microfluidic applications is that the in situ photopolymerization process requires a solution of monolith precursors, photoinitiators, and porogens to be injected into the microchannels prior to UV exposure, followed by extensive washing steps and any applicable functionalization operations needed to modify the monolith surface. These steps can be cumbersome and highly time consuming, with a typical device requiring a sequence of 3 or more perfusion steps performed over a period of several days. The incursion of precursor, wash, and functionalization solutions into other regions of the microfluidic system during the various perfusion steps can also affect the channel surface chemistry in unintended or undesirable ways.

In situ photopolymerization also necessitates the use of a UV-transparent chip material to allow for exposure through the top or bottom of the chip, limiting the range of substrate materials in which polymer monoliths can be fabricated in situ. Additionally, the chip substrate must also be compatible with the solvent used to induce phase separation during polymerization, further limiting the substrate material options.

Another limitation of in situ fabricated monoliths relates to the attachment of the porous material to the microchannel walls. Because polymer monoliths shrink both during photopolymerization and after aging, chemical attachment methods specific to the channel sidewall material must be implemented to minimize delamination from the channel walls. There are a variety of known attachment schemes. See, e.g., T. B. Stachowiak et al., *Fabrication of porous polymer monoliths covalently attached to the walls of channels in plastic microdevices*, pp. 3689-3693, 2003; I. Nischang et al., *Advances in the preparation of porous polymer monoliths in capillaries and microfluidic chips with focus on morphological aspects*, Analytical and bioanalytical chemistry, vol. 397, no. 3, pp. 953-60, June 2010. However, despite the various attachment schemes, avoiding delamination remains a challenge for monoliths fabricated in situ in microchannels. Because monoliths shrink in proportion to their size during polymerization, these attachment schemes become increasingly difficult in larger channels. This phenomenon, combined with the spatial limitations of masked photoinitiation, means that well sealed in situ fabricated monoliths with high aspect ratio (hydrodynamic diameter to length) are exceedingly difficult to produce. Such high aspect ratio monoliths are desirable in applications where a high flow rate or low pressure are required.

A known way of sidestepping some of the constraints of in situ integration of polymer monoliths in channels of a fluidic chip is to integrate capillary-encased monolith segments into a polydimethylsiloxane (PDMS) chip. See, e.g., H. Hisamoto et al., *Integration of valving and sensing on a capillary-assembled microchip*, Analytical chemistry, vol. 77, no. 7, pp. 2266-71, April 2005. In this case, glass capillaries with rectangular cross-section are used to provide structural integrity for the monolith during insertion into a channel of a fluidic chip. This hybrid glass/elastomer approach allows for covalent attachment between the glass and monolith surfaces, but monolith attachment to the inner wall of the capillary requires additional surface treatment steps. Moreover, the overall capillary integration process imposes a mismatch in cross-sectional dimensions between the channels in the PDMS chip and the capillary-supported monoliths, resulting in a dead volume at the fluidic interfaces between each capillary and the mating channel. In addition, the technique relies on compliant elastomer channel walls for effective leak-free integration of the silica capillaries and, thus, cannot be readily adapted to thermoplastic microfluidic chips fabricated using traditional bonding strategies.

Accordingly, there is a need in the art for improved integration of polymer monoliths into fluidic chips.

There is also a need in the art for improved nucleic acid capture, which is often a necessary step prior to polymerase chain reaction (PCR) amplification during genetic analysis. Nucleic acid capture and purification isolates the nucleic acids from other components of biological sample matrices, such as cell lysate and blood plasma, which could introduce components that inhibit PCR replication of target deoxyribonucleic acid (DNA) sequences, degrade the efficiency of the amplification process, and result in poor assay reproducibility. See, e.g., M. C. Breadmore et al., *Microchip-based purification of DNA from biological samples*, Anal. Chem., vol. 75, no. 8, pp. 1880-6, April 2003.

Modern laboratory scale DNA purification is typically achieved by silica-based solid phase extraction (SPE) where cell lysate is exposed to a silica surface in the presence of chaotropic agents. See, e.g., N. V. Ivanova et al., *An inexpensive, automation-friendly protocol for recovering high-quality DNA*, Mol. Ecol. Notes, vol. 6, no. 4, pp. 998-1002, July 2006. This strategy has been employed in a variety of microfluidic formats using packed beds of silica beads and polymer monoliths with embedded silica particles as the solid phase. See, e.g., L. A. Legendre et al., *A simple, valveless microfluidic sample preparation device for extraction and amplification of DNA from nanoliter-volume samples*, Anal. Chem., vol. 78, no. 5, pp. 1444-51, March 2006; A. Bhattacharyya and C. M. Klapperich, *Thermoplastic microfluidic device for on-chip purification of nucleic acids for disposable diagnostics*, Anal. Chem., vol. 78, no. 3, pp. 788-92, February 2006. The extraction efficiency of SPE methods is high (68% to 80%), but the chaotropic agents can be potent PCR inhibitors, thereby requiring copious washing to ensure that an inhibitor-free DNA solution is eluted as a final product.

An aqueous and PCR compatible alternate approach to chaotropic SPE is electrostatically driven, pH modulated nucleic acid capture on an amine-rich surface that can be controllably switched between cationic and neutral states. Such charge switching methods have been implemented in microfluidic systems, with various aminosilanes used to coat glass microchannels to yield a capture substrate with pH switchable surface charge. See, e.g., J. Wen et al., *DNA extraction using a tetramethyl orthosilicate-grafted photopolymerized monolithic solid phase*, Anal. Chem., vol. 78, no. 5, pp. 1673-81, March 2006.

As an effective alternative to aminosilanes, the aminosacharide biopolymer chitosan has also been employed as a pH modulated surface treatment for nucleic acid capture in microfluidic devices. See e.g., W. Cao et al., *Chitosan as a polymer for pH-induced DNA capture in a totally aqueous system*, Anal. Chem., vol. 78, no. 20, pp. 7222-8, October 2006; C. R. Reedy et al., *Solid phase extraction of DNA from biological samples in a post-based, high surface area poly (methyl methacrylate) (PMMA) microdevice*, Lab Chip, vol. 11, no. 9, pp. 1603-11, May 2011; K. A. Hagan et al., *Chitosan-coated silica as a solid phase for RNA purification in a microfluidic device*, Anal. Chem., vol. 81, no. 13, pp. 5249-56, July 2009.

While high loading levels and extraction efficiencies have been reported using chitosan as a charge-switching polymer for microfluidic DNA capture and release, known methods require long channels distributed over large device areas to achieve this performance. This constraint is imposed by the need for sufficient surface area to achieve acceptable loading capacity. While high aspect ratio microstructures can be used to enhance surface area, this approach requires the application of complex fabrication methods that are undesirable for use in disposable sample preparation chips. Furthermore, long or wide channels are required so that the residence time during perfusion through the capture zone is significantly longer than the characteristic diffusion time for each sample component, ensuring sufficient interactions between DNA and the channel walls to promote efficient capture.

An approach for the direct attachment of proteins to glycidyl methacrylate (GMA) monoliths is known. See R. Mallik et al., *High-Performance Affinity Monolith Chromatography: Development and Evaluation of Human Serum Albumin Columns preparation of high-performance affinity monolithic col-*, vol. 76, no. 23, pp. 7013-7022, 2004. In this approach, direct reaction between primary amines of the protein and the exposed reactive epoxy groups on the GMA monolith is achieved in the absence of a separate cross-linking agent, providing a simple and convenient route to monolith functionalization. However, due to the limited reaction efficiency, this technique required a 6 day, room temperature perfusion of protein solution at pH 8 through the GMA monolith to achieve adequate conjugation. For conventional microfluidic applications, where monoliths are fabricated in situ within a microchannel by patterned photopolymerization, the extended reaction time renders the direct reaction route impractical, since each individual chip requires photolithographic fabrication of the monolith elements followed by extended reagent perfusion and incubation.

Accordingly, there is a need in the art for improved nucleic acid capture using chitosan.

SUMMARY

One aspect of the invention relates to incorporation of discrete high aspect ratio polymer monolith elements into thermoplastic fluidic chips. Some embodiments relate to methods for incorporation may be entirely different than conventional methods in that they involve ex situ fabrication of bare monolith elements followed by integration of the preformed monoliths into the final microfluidic system. In some embodiments, the ex situ fabricated bare monolith elements may also be functionalized ex situ. In some embodiments, the integration of the preformed bare monolith elements may be solvent-assisted integration. In some embodiments, the ex situ fabrication technique may allow for multiple monolith elements of differing chemistry, porosity, and/or functionality to be fabricated off-chip in a parallel batch process before integration of one or more discrete elements into the final device. In some embodiments, the ex situ approach may provide greatly enhanced processing throughput over in situ monolith preparation by eliminating the need for sequential processing steps to be performed on-chip for the preparation of single monolith zones. In some embodiments, the ex situ approach may allow multiple monoliths with different surface and bulk properties to be integrated within a single microfluidic chip using a unified fabrication process. Examples showing the utility of the ex situ integration method include fabrication of a multi-element immunosensor as well as a microfluidic wettability-based bubble separator composed of closely spaced hydrophobic and hydrophilic monoliths.

Another aspect of the invention relates to a simple approach to microfluidic, pH-modulated nucleic acid capture in the form of a chitosan-functionalized porous polymer monolith. By employing monolith elements with high surface area and small pore size as chitosan supports, highly effective DNA capture with exceptionally high loading limits may be achieved in a small on-chip footprint. In some embodiments, the tortuous pore networks inherent to the polymer monoliths may also enable rapid release during the elution step. In some embodiments, porous monoliths may be used as high surface area substrates for efficient DNA capture. In some embodiments, chitosan-bearing monoliths may be fabricated ex situ followed by integration of the pre-functionalized monolith elements into fluidic devices. In some embodiments, the off-chip fabrication may enable parallel batch scale preparation of the chitosan-bearing monoliths. In some embodiments, the fluidic devices may be disposable and/or thermoplastic fluidic devices. In some embodiments, the fluidic devices may be microfluidic devices. In some embodiments, the integration of ex situ fabricated chitosan functionalized porous polymer monoliths may provide a scalable and low cost option for integrating nucleic acid capture, concentration, and release functionality to a range of microfluidic analytical platforms fabricated in thermoplastics. In some non-limiting embodiments, a fluidic device into which an ex situ fabricated chitosan functionalized porous polymer monolith has been integrated may achieve DNA loading levels above 100 ng using 1 mm long monolith capture elements and repeatable recovery above 50% of the total loaded DNA sample.

One aspect of the invention may provide a method of incorporating one or more porous polymer monoliths into a fluidic chip. The method may include inserting one or more bare preformed porous polymer monoliths into one or more channels of a channel substrate of the fluidic chip.

In some embodiments, the method may include fabricating the one or more bare porous polymer monoliths. In some embodiments, fabricating the one or more bare porous polymer monoliths may include fabricating one or more porous polymer monoliths in a mold. In some embodiments, fabricating the one or more monoliths in the mold may include adding a pre-monolith solution to one or more channels of a molding substrate, photopolymerizing the pre-monolith solution, and removing the polymerized solution from the one or more channels of the molding substrate.

In some embodiments, the method may include chemically functionalizing one or more porous polymer monoliths, and the one or more inserted monoliths may include the one or more functionalized porous polymer monoliths. In some embodiments, chemically functionalizing one or more porous polymer monoliths may include immobilizing a capture probe on the one or more porous polymer monoliths. In some embodiments, the capture probe may be an antibody, protein, amino acid, or peptide. In some embodiments, the capture probe may be labeled with a fluorescent marker. In some embodiments, the capture probe may be chitosan. In some embodiments, the chitosan may be immobilized on the one or more porous polymer monoliths using a bifunctional cross-linker. In some embodiments, the chitosan may be immobilized on the one or more porous polymer monoliths through a direct reaction of the chitosan with the one or more porous polymer monoliths.

In some embodiments, the method may include bonding a capping layer to the channel substrate of the fluidic chip, and bonding the capping layer to the channel substrate may seal the one or more bare porous polymer monoliths in the one or more channels of the channel substrate of the fluidic chip. In some embodiments, inserting the one or more monoliths into one or more channels of the channel substrate may include depositing a bare porous polymer monolith within a droplet of water onto the channel substrate and seating the deposited monolith into a channel of the channel substrate. In some embodiments, the method may include suspending a bare porous polymer monolith in water and drawing the suspended monolith into a pipette, and the monolith deposited onto the channel substrate may be deposited from the pipette. In some embodiments, the method may include removing the water droplet from the channel substrate and drying the channel substrate. In some embodiments, seating the deposited monolith into the channel may include agitating the deposited monolith.

In some embodiments, the one or more monoliths may have cross-sectional dimensions larger than the cross-sectional dimensions of the one or more channels. In some embodiments, the one or more monoliths may be oversized relative to the one or more channels. In some embodiments, inserting the one or more bare porous polymer monoliths into the one or more channels of the channel substrate of the fluidic chip may include inserting a first bare porous polymer monolith in a channel of the one or more channels of the channel substrate and inserting a second bare porous polymer monolith in the channel of the one or more channels of the channel substrate. In some embodiments, the first monolith may have a first functionalization, the second monolith may have a second functionalization, and the first functionalization may be different than the second functionalization. In some embodiments, the first monolith may include a first monolith chemistry, the second monolith may include a second monolith chemistry, and the first monolith chemistry and the second monolith chemistry may be different. In some embodiments, the first monolith chemistry may be hydrophilic, and the second monolith chemistry may be hydrophobic.

In some embodiments, the method may include anchoring the one or more inserted monoliths to walls of the one or more channels. In some embodiments, anchoring the one or more inserted monoliths may include softening the one or more channels of the channel substrate of the fluidic chip. In some embodiments, softening the one or more channels of the channel substrate of the fluidic chip may include exposing at least a portion of the one or more channels to a solvent. In some embodiments, the solvent may include decahydronaphthalene (decalin). In some embodiments, the solvent may include a solution of decalin in ethanol. In some embodiments, anchoring the one or more inserted monoliths to the walls of the one or more channels may result in mechanical interlocking of the one or more inserted monoliths and the walls of the one or more channels. In some embodiments, anchoring the one or more inserted monoliths to the walls of the one or more channels does not result in covalent attachment of the one or more inserted monoliths and the walls of the one or more channels.

Another aspect of the invention may provide a fluidic chip including a channel substrate and one or more bare porous polymer monoliths. The channel substrate may include one or more channels. The one or more bare porous polymer monoliths may be mechanically anchored to walls of the one or more channels of the channel substrate.

In some embodiments, the one or more mechanically anchored bare porous polymer monoliths may include one or more chemically functionalized porous polymer monoliths. In some embodiments, the one or more chemically functionalized porous polymer monoliths may include immobilized capture probes. In some embodiments, the immobilized capture probes may include antibodies, proteins, aptamers, amino acids, peptides, or synthetic capture probes. In some embodiments, the immobilized capture probes may be labeled with fluorescent markers. In some embodiments, the immobilized capture probes may be chitosan. In some embodiments, the chitosan may be immobilized on one or more porous polymer monoliths using a bifunctional crosslinker. In some embodiments, the chitosan may be immobilized through a direct reaction of the chitosan with one or more porous polymer monoliths.

In some embodiments, the fluidic chip may include a capping layer bonded to the channel substrate, and the one or more monoliths may be sealed within the one or more channels of the channel substrate between the channel substrate and the capping layer. In some embodiments, the channel substrate may be a thermoplastic substrate. In some embodiments, the channel substrate may include cyclic olefin copolymer. In some embodiments, the one or more channels of the channel substrate may have a triangular or trapezoidal cross-section. In some embodiments, the one or more monoliths may have a triangular or trapezoidal cross-section. In some embodiments, the one or more monoliths may have cross-sectional dimensions larger than the cross-sectional dimensions of the one or more channels. In some embodiments, the one or more monoliths may be oversized relative to the one or more channels.

In some embodiments, the one or more bare porous polymer monoliths may include a first monolith in a channel of the one or more channels of the channel substrate and a second monolith in the channel of the one or more channels of the channel substrate. In some embodiments, the first monolith may have a first functionalization, the second monolith may have a second functionalization, and the first functionalization may be different than the second functionalization. In some embodiments, the first and second monoliths may be functionalized with different fluorescent markers. In some embodiments, the first monolith may include a first monolith chemistry, the second monolith may include a second monolith chemistry, and the first monolith chemistry and the second monolith chemistry may be different. In some embodiments, the first monolith chemistry may be hydrophilic, and the second monolith chemistry may be hydrophobic. In some embodiments, the first monolith may be un-functionalized, and the second monolith may be functionalized. In some embodiments, the one or more bare porous polymer monoliths may include a third monolith in the channel of the one or more channels of the channel substrate, the second monolith may be functionalized with covalently-attached immunoglobin-binding protein, and the third monolith may be functionalized with a covalently-attached fluorescent marker and immunoglobin conjugate.

In some embodiments, the one or more channels of the channel substrate may include an inlet of a T-junction, a first downstream branch of the T-junction, and a second downstream branch of the T-junction; the one or more bare porous polymer monoliths may include first and second monoliths; the first monolith may be in the first downstream branch of the T-junction, may be adjacent to the inlet of the T-junction, and may include a hydrophobic monolith chemistry; and the second monolith may be in the second downstream branch of the T-junction, may be adjacent to the inlet of the T-junction, and may include a hydrophilic monolith chemistry. In some embodiments, the first monolith may include butylmethacrylate, and the second monolith may include glycidyl methacrylate.

In some embodiments, the one or more channels may have one or more of a width and a height within a range greater than or equal to 10 micrometers and less than or equal to 1 centimeter. In some embodiments, the one or more channels may have one or more of a width and a height within a range greater than or equal to 1 millimeter and less than or equal to 1 centimeter. In some embodiments, the one or more channels may have one or more of a width and a height within a range greater than or equal to 100 micrometers and less than or equal to 1 millimeter. In some embodiments, the one or more channels may have one or more of a width and a height within a range greater than or equal to 10 micrometer and less than or equal to 100 micrometers.

In some embodiments, the one or more monoliths may have a length within a range greater than or equal to 10 micrometers and less than or equal to 1 centimeter. In some embodiments, the one or more monoliths may have a length within a range greater than or equal to 1 millimeter and less than or equal to 1 centimeter. In some embodiments, the one or more monoliths may have a length within a range greater than or equal to 100 micrometers and less than or equal to 1 millimeter. In some embodiments, the one or more monoliths may have a length within a range greater than or equal to 10 micrometer and less than or equal to 100 micrometers.

Still another aspect of the invention may provide a chitosan-functionalized porous polymer monolith including a porous polymer monolith and a chitosan anchored to the porous polymer monolith. In some embodiments, the chitosan may be anchored to the porous polymer monolith using a bifunctional cross-linker. In some embodiments, the bifunctional cross-linker may be N-[γ-maleimidobutyryloxy]succinimide ester. In some embodiments, the chitosan may be anchored to the porous polymer monolith through a direct reaction of the chitosan with the porous polymer monolith. In some embodiments, the porous polymer monolith may include glycidyl methacrylate.

Another aspect of the invention may provide a method for manufacturing a chitosan-functionalized porous polymer monolith. The method may include anchoring chitosan to a porous polymer monolith. In some embodiments, anchoring the chitosan may include using a bifunctional cross-linker to couple amines from the chitosan with epoxy groups on the porous polymer monolith. In some embodiments, the bifunctional cross-linker may be N-[γ-maleimidobutyryloxy]succinimide ester. In some embodiments, the anchoring the chitosan may include directly attaching chitosan on the porous polymer monolith through a direct reaction of the chitosan with the porous polymer monolith.

The above and other embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements. Additionally, the left-most digit(s) of the reference number identifies the drawing in which the reference number first appears.

FIG. 5 is a schematic diagram illustrating the addition of pre-monolith solution to a mold embodying aspects of the present invention.

FIG. 6 is a schematic diagram illustrating monolith de-molding embodying aspects of the present invention.

FIG. 7 is an optical micrograph of a trapezoidal monolith element embodying aspects of the present invention.

FIGS. 8A and 8B are a schematic diagrams illustrating functionalization of one or more porous polymer monoliths embodying aspects of the present invention.

FIG. 10 is a schematic diagram illustrating insertion of one or more bare preformed porous polymer monoliths into one or more channels of a fluidic chip embodying aspects of the present invention.

FIG. 11 is a top view of bare preformed porous polymer monoliths inserted into a channel of a fluidic chip embodying aspects of the present invention.

FIG. 12 is a schematic diagram illustrating bonding of a capping layer to a channel substrate embodying aspects of the present invention.

FIG. 14 is a scanning electron microscope image of a trapezoidal porous polymer monolith integrated in a channel of a fluidic chip embodying aspects of the present invention.

FIG. 18 is a top view image of porous polymer monoliths integrated in a channel of a fluidic chip embodying aspects of the present invention.

FIGS. 20A-20F are top view images of a wettability-based bubble separator separating air and water from a two phase flow embodying aspects of the present invention.

FIG. 21A is flat side view of the chitosan functionalized triangular porous polymer monolith in the triangular channel of the channel substrate of a microfluidic chip embodying aspects of the present invention.

FIG. 21B is a scanning electron microscope cross-section image of a chitosan functionalized triangular porous polymer monolith in a triangular channel of a channel substrate of a microfluidic chip embodying aspects of the present invention.

FIG. 22 is a schematic diagram illustrating a direct reaction between a GMA monolith and chitosan embodying aspects of the present invention.

DETAILED DESCRIPTION OF PREFERRED EMBODIMENTS

Figures 1A, 2A:
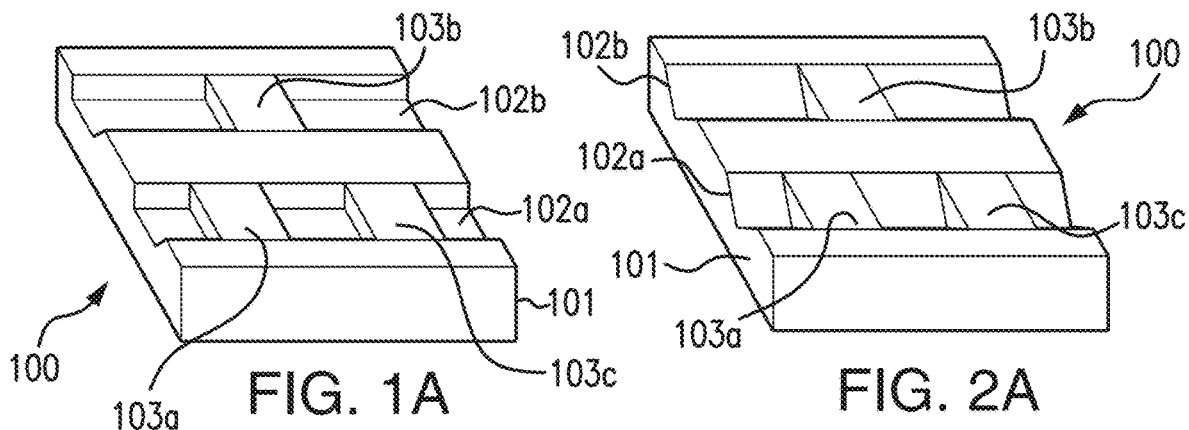
FIG. 1A illustrates a perspective view of top, side, and end of a portion of a channel substrate of a fluidic chip embodying aspects of the present invention.
FIG. 2A illustrates a perspective view of top, side, and end of a portion of a channel substrate of a fluidic chip embodying aspects of the present invention.

FIG. 1A illustrates a perspective view of top, side, and end of a portion of a channel substrate 101 of a fluidic chip 100 embodying aspects of the present invention. In some non-limiting embodiments, the fluidic chip 100 may be a microfluidic chip. In some embodiments, the fluidic chip 100 may include a channel substrate 101. In some non-limiting embodiments, the channel substrate 101 may comprise a thermoplastic, such as, for example and without limitation, cyclic olefin copolymer (COC). In some embodiments, the channel substrate 101 may include one or more channels 102. In some non-limiting embodiments, the one or more channels 102 may comprise one or more microchannels. In some non-limiting embodiments, as illustrated in FIG. 1A, the one or more channels 102 of the channel substrate 101 may include a first channel 102a and a second channel 102b.

In some non-limiting embodiments, the one or more channels 102 may have a width within a range greater than or equal to 10 micrometers and less than or equal to 1 centimeter, and this range should be understood as describing and disclosing all widths (including all decimal or fractional widths) within this range. In some non-limiting embodiments, the one or more channels 102 may have a width within a range greater than or equal to 1 millimeter and less than or equal to 1 centimeter, and this range should be understood as describing and disclosing all widths (including all decimal or fractional widths) within this range. In some non-limiting embodiments, the one or more channels 102 may have a width within a range greater than or equal to 100 micrometers and less than or equal to 1 millimeter, and this range should be understood as describing and disclosing all widths (including all decimal or fractional widths) within this range. In some non-limiting embodiments, the one or more channels 102 may have a width within a range greater than or equal to 10 micrometers and less than or equal to 100 micrometers, and this range should be understood as describing and disclosing all widths (including all decimal or fractional widths) within this range. However, this is not required, and, in some alternative embodiments, the one or more channels 102 may have widths outside these ranges.

In some non-limiting embodiments, the one or more channels 102 may have a height (i.e., depth) within a range greater than or equal to 10 micrometers and less than or equal to 1 centimeter, and this range should be understood as describing and disclosing all heights (including all decimal or fractional heights) within this range. In some non-limiting embodiments, the one or more channels 102 may have a height within a range greater than or equal to 1 millimeter and less than or equal to 1 centimeter, and this range should be understood as describing and disclosing all heights (including all decimal or fractional heights) within this range. In some non-limiting embodiments, the one or more channels 102 may have a height within a range greater than or equal to 100 micrometers and less than or equal to 1 millimeter, and this range should be understood as describing and disclosing all heights (including all decimal or fractional heights) within this range. In some non-limiting embodiments, the one or more channels 102 may have a height within a range greater than or equal to 10 micrometers and less than or equal to 100 micrometers, and this range should be understood as describing and disclosing all heights (including all decimal or fractional heights) within this range. However, this is not required, and, in some alternative embodiments, the one or more channels 102 may have heights outside these ranges.

In some embodiments, the fluidic chip 100 may include one or more porous polymer monoliths 103. In some embodiments, the one or more porous polymer monoliths 103 may be integrated in one or more channels 102 of the channel substrate 101. In some embodiments, a channel 102 may include one or more integrated porous polymer monoliths 103. For example, in the non-limiting embodiment illustrated in FIG. 1A, the first channel 102a may include porous polymer monoliths 103a and 103c, and the second channel 102b may include porous polymer monolith 103b.

In some non-limiting embodiments, the one or more porous polymer monoliths 103 may have a length within a range greater than or equal to 10 micrometers and less than or equal to 1 centimeter, and this range should be understood as describing and disclosing all lengths (including all decimal or fractional lengths) within this range. In some non-limiting embodiments, the one or more porous polymer monoliths 103 may have a length within a range greater than or equal to 1 millimeter and less than or equal to 1 centimeter, and this range should be understood as describing and disclosing all lengths (including all decimal or fractional lengths) within this range. In some non-limiting embodiments, the one or more porous polymer monoliths 103 may have a length within a range greater than or equal to 100 micrometers and less than or equal to 1 millimeter, and this range should be understood as describing and disclosing all lengths (including all decimal or fractional lengths) within this range. In some non-limiting embodiments, the one or more porous polymer monoliths 103 may have a length within a range greater than or equal to 10 micrometers and less than or equal to 100 micrometers, and this range should be understood as describing and disclosing all lengths (including all decimal or fractional lengths) within this range. However, this is not required, and, in some alternative embodiments, the one or more monoliths 103 may have lengths outside these ranges.

In some embodiments, the one or more porous polymer monoliths 103 may include one or more functionalized porous polymer monoliths. In some non-limiting embodiments, the functionalized porous polymer monoliths may be functionalized, for example and without limitation, as immunosensors, bubble separators, or nucleic acid purifiers. In some non-limiting embodiments, porous polymer monoliths 103 may be chemically functionalized. In some non-limiting embodiments, chemical functionalization of a porous polymer monolith 103 may comprise immobilization of a capture probe on the one or more porous polymer monoliths. In some embodiments, the capture probe may be an antibody, protein (e.g., protein G, which may be from *Streptococcus*), aptamer, amino acid, peptide, or synthetic capture probe. In some embodiments, the capture probe may labeled with a fluorescent marker (e.g., rhodamine, fluorescein isothiocyanate (FITC), or quantum dots). In some embodiments, the capture probe may be capable of electrostatically driven, pH modulated nucleic acid capture (e.g., chitosan).

In some embodiments, the fluidic chip 100 may include two or more porous polymer monoliths 103, and the two or more porous polymer monoliths 103 may have differing chemistries, porosity, and/or functionality. For example, in some non-limiting embodiments, one or more of the porous polymer monoliths 103 may have a chemistry comprising glycidyl methacrylate (GMA), and one or more of the porous polymer monoliths 103 may have a chemistry comprising butylmethacrylate (BMA). In another example, in some non-limiting embodiments, the porous polymer monoliths 103 may have the same chemistry but be functionalized with different fluorescent markers (e.g., rhodamine and FITC).

Figures 1B, 2B:
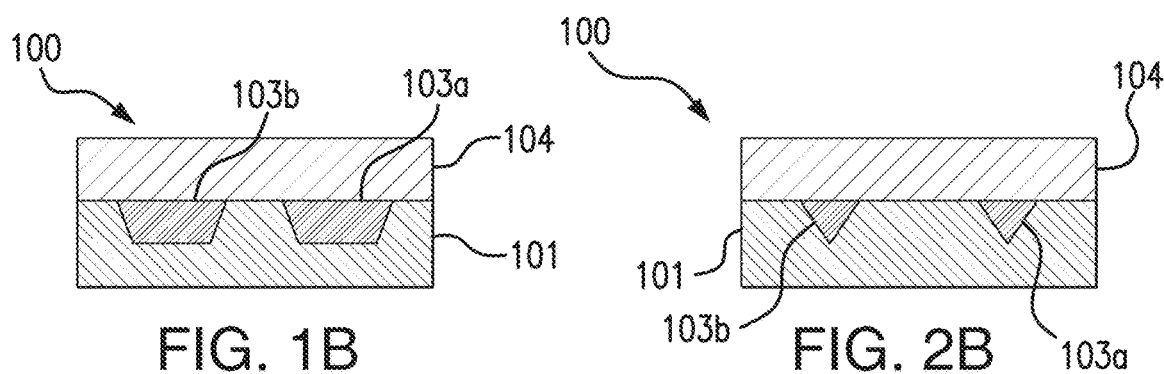
FIG. 1B illustrates a cross-sectional view of a fluidic chip embodying aspects of the present invention.
FIG. 2B illustrates a cross-sectional view of a fluidic chip embodying aspects of the present invention.

FIG. 1B illustrates a cross-sectional view of the fluidic chip 100 illustrated in FIGS. 1A and 2B, respectively. In some embodiments, as illustrated in FIG. 1B, the fluidic chip 100 may include a capping layer (i.e., cover plate or second substrate) 104. In some embodiments, the capping layer 104 may be bonded to the channel substrate 101. In some embodiments, the capping layer 104 may enclose the channels 102 of the channel substrate 101. In some embodiments, the capping layer 104 may seal the one or porous polymer monoliths 103 within the one or more channels 102 of the channel substrate 101 between the channel substrate 101 and the capping layer 104. In some embodiments, the one or more porous polymer monoliths 103 may be mechanically anchored to walls of the one or more channels 102 of the channel substrate 101. In some embodiments, the one or more porous polymer monoliths 103 may be mechanically anchored to the capping layer 104. In some non-limiting embodiments, the one or more porous polymer monoliths 103 may be anchored directly to walls of the one or more channels 102, and the one or more porous polymer monoliths 103 are not within one or more capillaries having outer surfaces covalently attached to walls of the one or more channels 102.

Figures 1C, 2C:
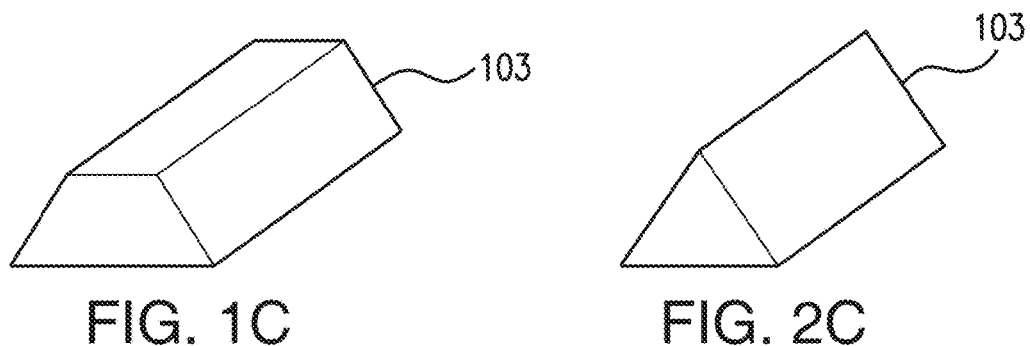
FIG. 1C illustrates a perspective view of a bottom, side, and end of a bare preformed porous polymer monolith embodying some aspects of the present invention.
FIG. 2C illustrates a perspective view of a bottom, side, and end of a bare preformed porous polymer monolith embodying aspects of the present invention.
Figures 1D, 2D:
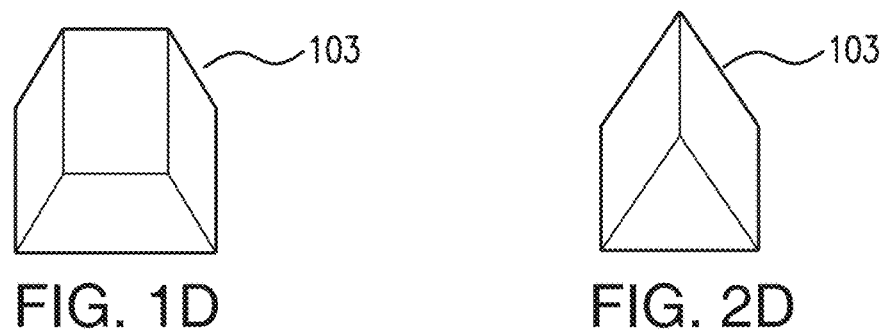
FIG. 1D illustrates a perspective view of a bottom and end of a bare preformed porous polymer monolith embodying some aspects of the present invention.
FIG. 2D illustrates a perspective view of a bottom and end of a bare preformed porous polymer monolith embodying aspects of the present invention.

FIGS. 1C and 1D illustrate perspectives of the porous polymer monolith 103. In some non-limiting embodiments, as illustrated in FIGS. 1A and 1B, the one or more channels 102 may have a trapezoidal cross-section, and, as illustrated in FIGS. 1B-1D, the one or more porous polymer monoliths 103 may have a trapezoidal cross-section. In some non-limiting embodiments, trapezoidal channels 102 and/or the trapezoidal monoliths 103 may have edges slanted at an angle (e.g., 45°) from the surface normal. However, a trapezoidal cross-section is not required, and, in some alternative embodiments, the one or more channels 102 and the one or more porous polymer monoliths 103 may have different cross-sectional shapes, such as, for example and without limitation, rectangular, triangular, or rounded (e.g., U-shaped) cross-sections. For example, FIGS. 2A-2D illustrate a non-limiting alternative embodiment of the fluidic chip 100 where the one or more channels 102 and the one or more porous polymer monoliths 103 have a triangular cross-section. FIGS. 2A-2D correspond to FIGS. 1A-1D, respectively, except for the cross-sectional shape of the one or more channels 102 and the one or more porous polymer monoliths 103.

Figure 3:
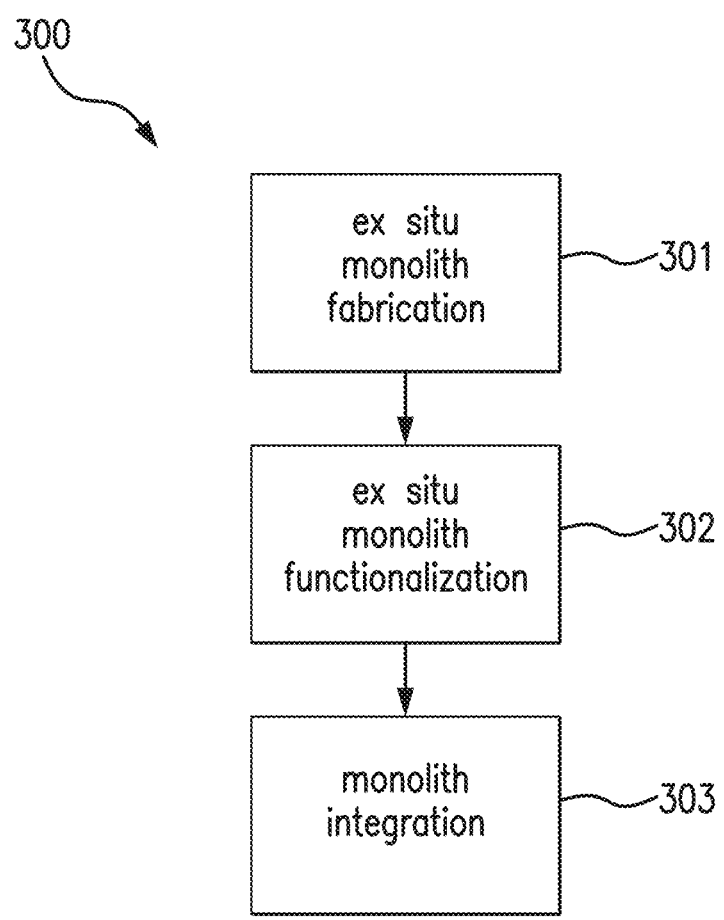
FIG. 3 is a flowchart illustrating a process for incorporating one or more porous polymer monoliths into a fluidic chip embodying aspects of the present invention.

FIG. 3 is a flowchart illustrating a process 300 for incorporating one or more porous polymer monoliths 103 into a fluidic chip 100 embodying aspects of the present invention. In some embodiments, the process 300 may include a step 301 for ex situ fabrication of one or more bare porous polymer monoliths 103. In some embodiments, the process 300 may include a step 302 for ex situ functionalization of one or more bare porous polymer monoliths 103. In some embodiments, the process 300 may include a step 303 for integration of the monolith of one or more bare porous polymer monoliths 103 into one or more channels 102 of a channel substrate 101 of the fluidic chip 100. In some embodiments, the integration step 303 may anchor and fluidically seal of the one or more integrated monoliths 103 in the one or more channels 102.

Figure 4:
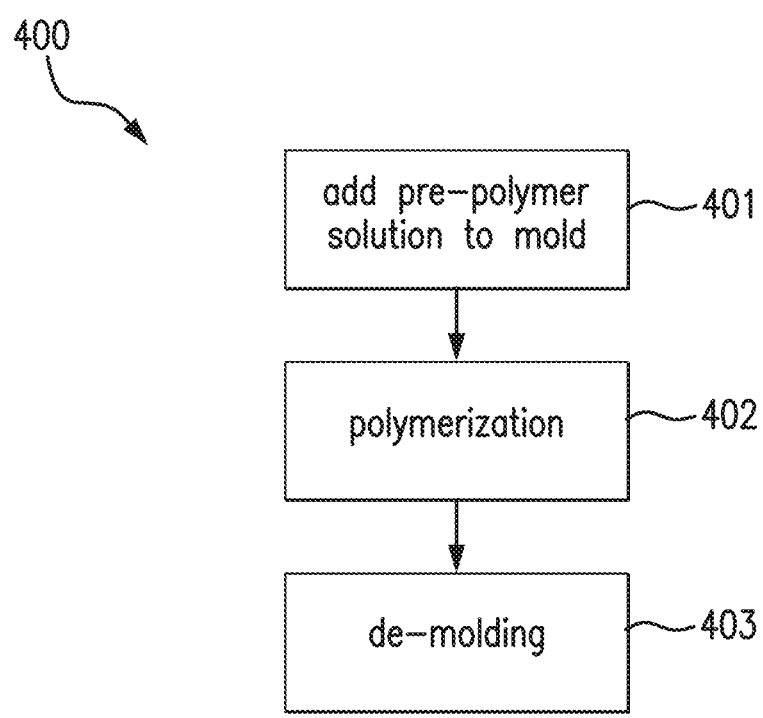
FIG. 4 is a flowchart illustrating a process for ex situ fabrication of one or more porous polymer monoliths embodying aspects of the present invention.

FIG. 4 is a flowchart illustrating a non-limiting process 400 for ex situ fabrication of one or more discrete bare porous polymer monoliths 103. In some non-limiting embodiments, the process 400 may be performed in step 301 of the process 300 for incorporating one or more porous polymer monoliths 103 into a fluidic chip 100.

In some embodiments, the process 400 may include a step 401 of adding a pre-monolith solution to a mold. As illustrated with reference to FIG. 5, step 401 may include adding a pre-monolith solution 504 to a mold 505. In some embodiments, the mold 505 may include a molding substrate 506 and a mold capping layer 507. In some non-limiting embodiments, the channel substrate 101 may comprise a thermoplastic, such as, for example and without limitation, COC. In some embodiments, the molding substrate 506 may include one or more molding channels 508. In some non-limiting embodiments, the one or more molding channels 508 may be one or more open trenches in a surface of the molding substrate 506. In some embodiments, the one or more molding channels 508 may have dimensions (e.g., cross-sectional dimensions) larger (e.g., 5-10% larger) than the dimensions of the one or more channels 102 of the channel substrate 101 of the fluidic chip 100.

In some embodiments, the mold capping layer 507 may temporarily seal the one or more molding channels 508 of the molding substrate 506. In some non-limiting embodiments, the mold capping layer 507 may comprise PDMS or electrical tape. In some embodiments, the pre-monolith solution 504 may be added to the one or more temporarily-sealed molding channels 508 of the molding substrate 506. In some non-limiting embodiments, an insertion device 509 (e.g., a syringe or pipette) may add the pre-monolith solution 508 to the one or more molding channels 508. In some non-limiting embodiments, the pre-monolith solution 504 may fill the one or more molding channels 508. In some non-limiting embodiments, the pre-monolith solution 504 may be added to the one or more temporarily-sealed molding channels 508 via one or more access holes. In some non-limiting embodiments, the one or more access holes may be sealed (e.g., with electrical tape) after the pre-monolith solution 504 is added to the one or more molding channels 508.

In some embodiments, measures to promote attachment to the walls of the molding channels 508 are omitted to ensure that the one or monoliths 103 may be removed from the molding channels 508 following photopolymerization. In some embodiments, the pre-monolith solution 504 may comprise GMA. In some non-limiting embodiments, the pre-monolith solution 504 may comprise GMA and one or more of ethoxylated trimethylpropane triacrylate (SR454), cyclohexanol, and methanol. In one non-limiting embodiment, the pre-monolith solution 504 may comprise 24% GMA, 16% SR454, 50% cyclohexanol, and 10% methanol (by weight). In some non-limiting embodiments, a photoinitiator, such as, for example and without limitation, 2,2-dimethoxy-2-phenylacetophenone (DMPA), equaling 1% of the combined weight of the GMA and SR454 may be added to the pre-monolith solution 504. However, this specific solution is not required, and some alternative embodiments may comprise another pre-monolith solution 504, such as, for example and without limitation, a solution comprising 1.4% GMA, 14.2% SR-454, 53.4% Cyclohexanol, 10.7% methanol, and 0.4% DMPA (by weight).

In addition, it is not necessary that the pre-monolith solution 504 comprise GMA, and, in some alternative embodiments, the pre-monolith solution 504 may comprise another monomer, such as, for example and without limitation, BMA. In some non-limiting alternative embodiments, the pre-monolith solution may comprise BMA and one or more of ethylenedimethacrylate (EDMA), 1,4butanediol, 1-propanol, and photoinitiator (e.g., DMPA). In one non-limiting alternative embodiment, the pre-monolith solution 504 may comprise 23.5% BMA, 15.5% EDMA, 34% 1,4-butanediol, 26% 1-propanol and 1% DMPA (by weight).

In some embodiments, the process 400 may include a step 402 of photopolymerizing the pre-monolith solution 504 to form one or more bare porous polymer monoliths 103. In some embodiments, photopolymerization of the monoliths 103 may be accomplished using a UV light source outputting UV light for a period of time. In some non-limiting embodiments, the photopolymerization may be accomplished by a UV light source outputting at a surface power density (e.g., 22 mW/cm$^2$ or 39 mW/cm$^2$) for a period of time (e.g., 600 s).

In some embodiments, the process 400 may include a step 403 of removing one or more bare porous polymer monoliths 103 from the mold 505. As illustrated with reference to FIG. 6, de-molding step 403 may include removing the mold capping layer 507 (e.g., peeling away a layer of electrical tape) and removing the one or more bare porous polymer monoliths 103 from the one or more molding channels 508 of the molding substrate 506 of the mold 505. In some non-limiting embodiments, the mold capping layer 507 may be removed from the molding substrate 506 with tweezers.

In some non-limiting embodiments, the process 400 may include cleaving or cutting the one or more bare porous polymer monoliths 103 to a prescribed length. In some non-limiting embodiments, the process 400 may include soaking the one or more bare porous polymer monoliths 103 in methanol followed by a methanol in water solution (e.g., 20% methanol in water) under gentle agitation (e.g., on a laboratory shaker) to remove solvent and any unreacted prepolymer. In some non-limiting embodiments, the process 400 may include one or more final rinse steps in small glass vials with gentle agitation (e.g., manual agitation). In some embodiments, the cleanup steps (e.g., soaking and/or rinse steps) may be part of a batch cleanup process in which multiple bare porous polymer monoliths 103 are cleaned up at the same time.

FIG. 7 is an optical micrograph of a trapezoidal porous polymer monolith 103 that may be formed by some embodiments of the ex situ monolith fabrication of step 301, which may be carried out, for example, by performing the ex situ monolith fabrication process 400 illustrated in FIG. 4. The trapezoidal porous polymer monolith 103 illustrated in FIG. 7 has a maximum width of approximately 200 μm. The trapezoidal porous polymer monolith 103 illustrated in FIG. 7 is being manipulated by a fine tip paint brush 710.

In some embodiments, as illustrated with reference to FIGS. 8A and 8B, the ex situ functionalization step 302 of the monolith incorporation process 300 may include immersing one or more bare porous polymer monoliths 103 in one or more solutions (e.g., solutions 811a and 811b) to functionalize the one or more bare porous polymer monoliths 103. In some embodiments, the one or more solutions 811a and 811b may each be held in a container (e.g., containers 812a and 812b, respectively). In some non-limiting embodiments, the functionalization step 302 may be a batch functionalization process in which multiple bare porous polymer monoliths 103 are functionalized at the same time (e.g., in the same container). In some non-limiting embodiments, as shown in FIGS. 8A and 8B, two or more different functionalizations may be performed in parallel. That is, in some non-limiting embodiments, a first set of one or more bare porous polymer monoliths 103a may be functionalized in a first solution 811a to have a first function, and, at the same time, a second set of one or more bare porous polymer monoliths 103c may be functionalized in a second solution 811b to have a second function that is different than the first function.

In some non-limiting embodiments, the ex situ functionalization step 302 may include chemically functionalizing one or more bare porous polymer monoliths 103. In some non-limiting embodiments, chemically functionalizing one or more bare porous polymer monoliths 103 may include immobilizing capture probes on the one or more porous polymer monoliths. In some non-limiting embodiments, the capture probes may be antibodies, proteins, aptamers, amino acids, peptides, or synthetic capture probes. In some non-limiting embodiments, the capture probes may be labeled with a fluorescent markers (e.g., rhodamine, FITC, or quantum dot). In some non-limiting embodiments, the capture probes may be capable of electrostatically driven, pH modulated nucleic acid capture (e.g., chitosan).

In some non-limiting embodiments, chemically functionalizing one or more bare porous polymer monoliths 103 may be accomplished using a multi-step reaction process. In some non-limiting embodiments, the multi-step reaction process may involve one or more cross-linkers (e.g., thiol groups and/or N-[γ-maleimidobutyryloxy]succinimide ester (GMBS)). In one none-limiting embodiment, the multi-step reaction process to functionalize the one or more bare porous polymer monoliths 103 may comprise one or more of (i) immersing the one or more monoliths 103 in a sodium hydrosulfide solution (e.g., a 2M sodium hydrosulfide solution created from a mixture of 20% methanol and 80% 0.1 M sodium phosphate dibasic at pH 8.15) to convert epoxide groups to thiols, (ii) eliminating (e.g., hydrolyzing) remaining epoxide groups by treatment (e.g., overnight treatment) of the one or more monoliths 103 with sulfuric acid (e.g., 0.5M sulfuric acid), (iii) incubating the one or more monoliths 103 in a GMBS solution (e.g., a 2 mM solution of GMBS in ethanol), and (iv) reacting the one or more monoliths 103 with the desired capture probes (e.g., the desired protein) diluted in a buffer solution (e.g., phosphate-buffered saline (PBS)) over a concentration range (e.g., 50-500 μg/mL) for a period of time (e.g., one hour).

However, a multi-step reaction process (e.g., involving one or more cross-linkers) is not necessary for chemically functionalizing one or more bare porous polymer monoliths 103, and, in some alternative embodiments, chemically functionalizing one or more bare porous polymer monoliths 103 may instead be accomplished using a multi-step reaction process through a direction reaction of the desired capture probes (e.g., the desired protein) with the one or more bare porous polymer monoliths 103.

In some embodiments, the ex situ functionalization step 302 may be optional. In other words, some embodiments incorporate one or more bare preformed porous polymer monoliths 103 that have not been subjected functionalization, and the ex situ functionalization step 302 is not performed for any such monoliths 103.

Figure 9:
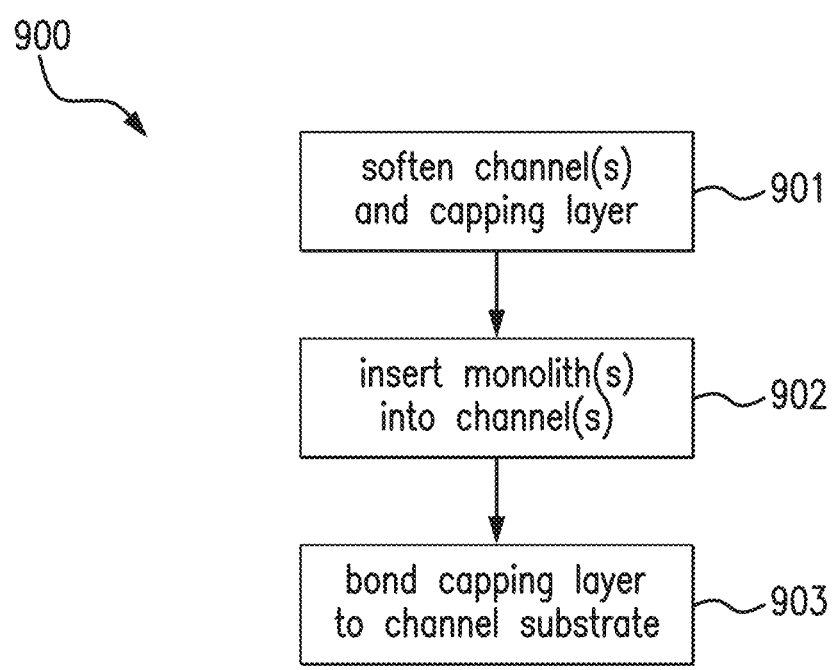
FIG. 9 is a flowchart illustrating a process for integration of one or more bare preformed monoliths embodying aspects of the present invention.

FIG. 9 is a flowchart illustrating a non-limiting process 900 for integration of one or more bare porous polymer monoliths 103 into one or more channels 102 of a channel substrate 101 of the fluidic chip 100. In some non-limiting embodiments, the process 900 may be performed in step 303 of the process 300 for incorporating one or more porous polymer monoliths 103 into a fluidic chip 100. In some embodiments, the integration process 900 may anchor and fluidically seal of the one or more monoliths 103 in the one or more channels 102. In some non-limiting embodiments, the integration process 900 may be a solvent bonding process that mechanically anchors the one or more monoliths 103 to the walls of one or more channels 102 (as opposed to chemically attaching the one or more monoliths 103 to the channel walls).

In some embodiments, the process 900 may include a step 901 of temporarily softening the capping layer 104 and one or more channels 102 of the channel substrate 101 of the fluidic chip 100. In some embodiments, temporarily softening the capping layer 104 comprises exposing the capping layer 104 to a solvent. See, e.g., T. I. Wallow et al., *Low-distortion, high-strength bonding of thermoplastic microfluidic devices employing case-II diffusion-mediated permeant activation*, Lab on a chip, vol. 7, no. 12, pp. 1825-31, December 2007. In some embodiments, temporarily softening one or more channels 102 comprises exposing at least a portion of the one or more channels (e.g., at least the portion of the one or more channels 102 where the one or more monoliths 103 will be placed) to the solvent. In some non-limiting embodiments, the solvent may comprise decahydronaphthalene (decalin). In some non-limiting embodiments, the solvent may comprise a solution of decalin in ethanol (e.g., a solution of 20 to 25% (by volume) decalin in ethanol). In some non-limiting embodiments, a small volume (e.g, 1-5 µl) of the solvent solution is pipetted into the region of the one or more channels 102 where the one or more monoliths 103 will be placed. In some non-limiting embodiments, the solvent solution is effective to achieve full sealing between the surfaces of the one or more monoliths 103, the one or more channels 102 of the channel substrate 101, and the capping layer 104 while preventing distortion of the one or more channels 102 during bonding. In some embodiments, the step 901 may include subsequently (e.g., after 10 minutes of solvent solution exposure) washing the one or more channels 102 of the channel substrate 101 and the capping layer 104 (e.g., in 100% ethanol) and quickly drying the channel substrate 101 and the capping layer 104 (e.g., using a stream of nitrogen) to prevent further solvent uptake.

In some embodiments, as illustrated with reference to FIG. 10, the process 900 may include a step 902 of inserting one or more bare preformed porous polymer monoliths 103 into one or more channels 102 of the channel substrate 101 of the fluidic chip 100. In some non-limiting embodiments, the one or more bare preformed porous polymer monoliths 103 are manually positioned at desired locations in the one or more channels 102 (e.g., using the fine-tipped brush 710 illustrated in FIG. 7). In some embodiments, as illustrated in FIG. 11, the insertion step 902 may insert two or more bare preformed porous polymer monoliths 103 (e.g., monoliths 103a and 103c) into a channel 102 of the channel substrate 101, and the two or more bare preformed porous polymer monoliths 103 may have different functionalizations.

In some embodiments, the as illustrated with reference to FIG. 12, the process 900 may include a step 903 of bonding/sealing a capping layer 104 to the channel substrate 101 of the fluidic chip 100. In some embodiments, bonding the capping layer 104 to the channel substrate 101 may seal the one or more inserted bare porous polymer monoliths 103 in the one or more channels 102 of the channel substrate 101 of the fluidic chip 100. In some non-limiting embodiments, the capping layer 104 may be bonded to the channel substrate 101 substrate using a pressure (e.g., in a range of 2 to 4 MPa, such as, for example and without limitation, approximately 3.5 MPa or 2.1 MPa) for a period of time (e.g., in a range of 10 to 20 minutes) within a temperature range (e.g., approximately 60° C.).

In some embodiments, to account for monolith shrinkage during processing, the one or more channels 102 receiving the one or more monoliths 103 may be fabricated with dimensions (e.g., cross-sectional dimensions) smaller (e.g., 5-10% smaller) than the dimensions of the one or more molding channels 508 to ensure full sealing at the periphery of the one or more monoliths 103. That is, in some embodiments, the one or more monoliths 103 may be oversized relative to the one or more channels 102.

In some embodiments, the bonding step 903 forces one or more bare porous polymer monoliths 103 into one or more solvent-softened channels 102 and results in an intimate seal between the material of the one or more monoliths 103 and the material(s) of the one or more channels 102 and the capping layer 104.

Although in some embodiments the one or more channels 102 and the one or more monoliths 103 have rectangular cross-sections, embodiments in which the one or more channels 102 and the one or more monoliths 103 have trapezoidal, triangular, or U-shaped cross-sections may have advantageous over the rectangular cross-section embodiments. For example, in rectangular cross-section embodiments, during insertion of a rectangular monolith into a rectangular channel, vertical alignment must be maintained to avoid collision of the rectangular monolith with either side-wall of the rectangular channel. In addition, because the rectangular monolith may be slightly oversized to ensure a good seal with the rectangular channel walls, high forces are required to insert the oversized rectangular monolith into the rectangular channel, which can result in monolith fracture. As a result, yield for intact monoliths integrated into rectangular cross-section channels may be poor. Monoliths having trapezoidal, triangular, or U-shaped cross-sections may overcome these issues.

In some trapezoidal, triangular, or U-shaped embodiments, the trapezoidal, triangular, or U-shaped channel cross-section may greatly simplify the alignment and insertion of monoliths with nearly-matched cross-sections during the initial steps of reintegration. In some trapezoidal, triangular, or U-shaped embodiments, the insertion step 902 (see FIG. 9) may effectively be one of self-assembly, with each monolith 103 readily seating itself into the receiving channel 102 after being manually positioned into the general target region. In these embodiments, careful alignment of the monolith 103 with the channel 102 may not be needed.

FIG. 13A-13D illustrate an example of monolith self-assembly process, which may be performed in the insertion step 902, for insertion of a bare preformed porous polymer monolith 103 into a channel 102 of a fluidic chip 100. Although a trapezoidal channel 102 and trapezoidal monolith 103 is illustrated in FIG. 13A-13D, the monolith self-assembly process is applicable to other channel and monolith cross-sectional shapes, such as, for example, channels and monoliths having triangular and U-shaped cross-sections.

Figure 13A:
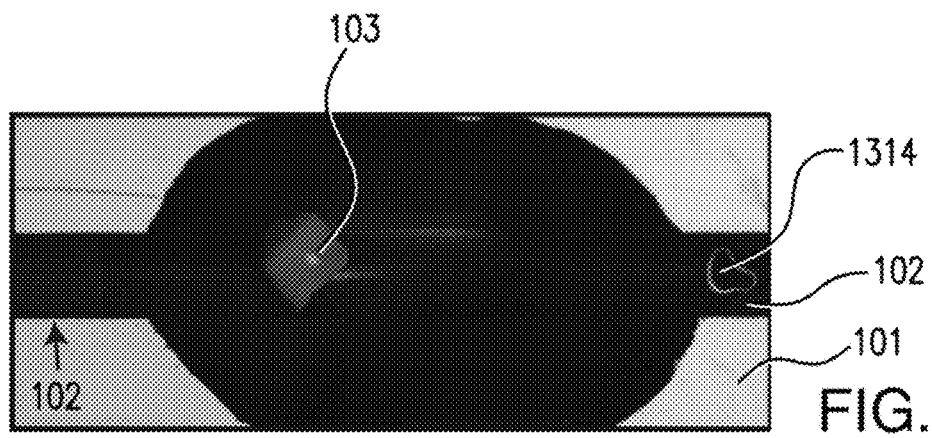
FIG. 13A-13D are schematic diagrams illustrating a monolith self-assembly process for insertion of a bare preformed porous polymer monolith into a channel of a fluidic chip embodying aspects of the present invention.
Figure 13B:
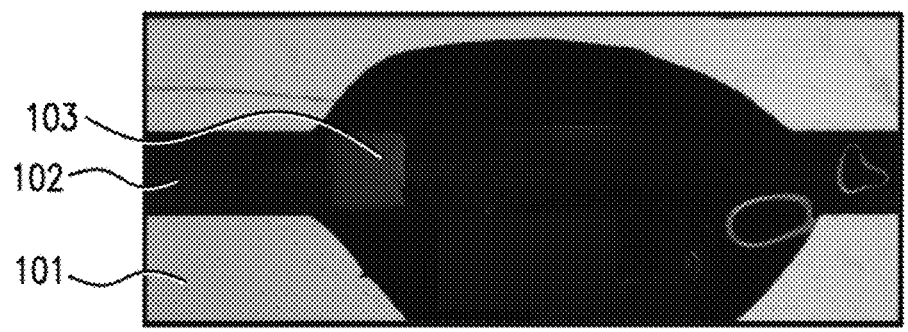
Figure 13C:
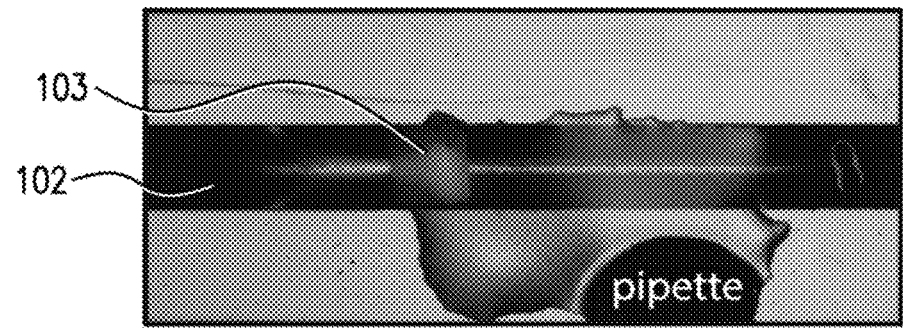
Figure 13D:
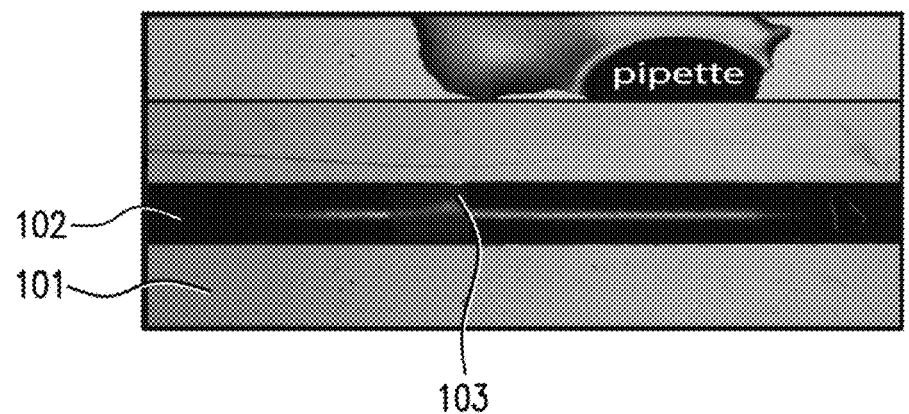

In some embodiments, the monolith self-assembly process may include suspending a bare porous polymer monolith 103 in water, and drawing the suspended monolith 103 into a pipette. In some embodiments, as illustrated in FIG. 13A, the monolith self-assembly process may include depositing the monolith 103 within a droplet 1314 of water onto the channel substrate 101 from the pipette. In some embodiments, as illustrated in FIG. 13B, the monolith self-assembly process may include seating the deposited monolith 103 into a channel 102 of the channel substrate 101. In some non-limiting embodiments, the monolith 103 may be seated in the mating channel 102 through gentle agitation together with capillary forces to move the monolith 103 until it enters the mating channel 102 to maximize surface area contact with the channel substrate 101. Although the angled sidewalls of the channel 102 and monolith 103 encourage seating of the monolith 103 into the desired configuration, a monolith 103 may enter the channel 102 in an improper orientation. In this event, the droplet 1314 may be retracted by pipette before repeating the process. In some embodiments, the monolith self-assembly process may include, as illustrated in FIG. 13C, removing the water droplet 1314 from the channel substrate 101 (e.g., using the pipette) and/or, as illustrated in FIG. 13D, drying the channel substrate 101 prior to the bonding step 903.

In some embodiments, in addition to supporting effective self-assembly of the one or more monoliths 103 into their mating channels 102 during the insertion step 902, the slanted sidewalls may ensure that each surface experiences a normal force during the bonding step 903 that serves to embed the one or more monoliths 103 within the channel walls of the channel substrate 101 during the bonding.

Figure 15:
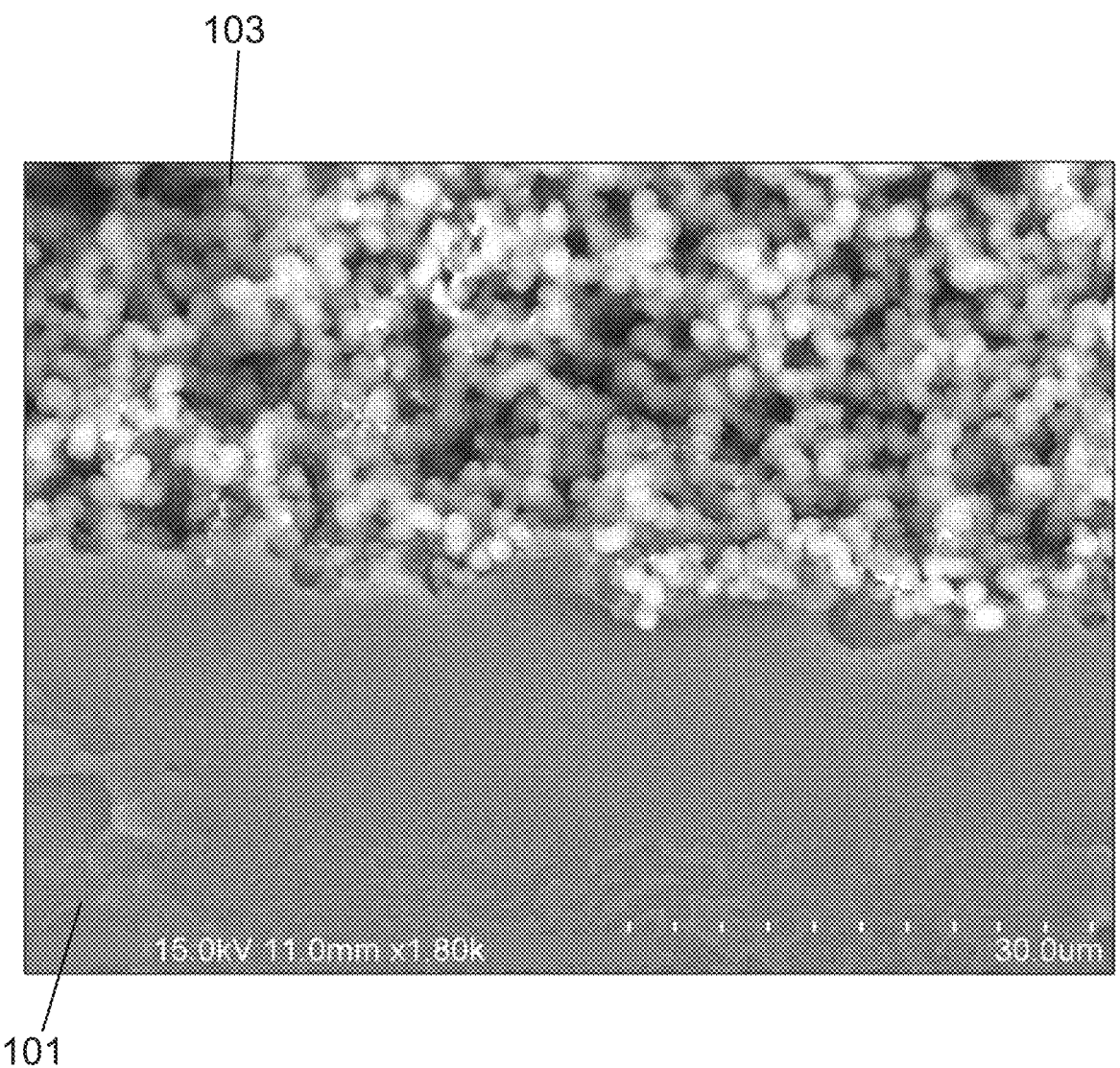
FIG. 15 is a scanning electron microscope image of mechanical interlocking of a porous polymer monolith with a wall of a channel of a channel substrate of a fluidic chip embodying aspects of the present invention.

FIG. 14 is a scanning electron microscope image of a non-limiting example of a trapezoidal porous polymer monolith 103 integrated in a channel 102 of a fluidic chip 100 according to some embodiments. FIG. 15 is a scanning electron microscope image of mechanical interlocking of a porous polymer monolith 103 with a wall of a channel 102 of a channel substrate 101 in a non-limiting example of a fluidic chip 100 according to some embodiments. In some embodiments, as illustrated in FIGS. 14 and 15, the integration of one or more ex situ fabricated monoliths 103 may result in anchoring of the one or more inserted monoliths 103 to walls of the one or more channels 102. In some non-limiting embodiments, as illustrated in FIG. 15, the anchoring may be mechanical interlocking of the one or more inserted monoliths 103 and the walls of the one or more channels 102. In some non-limiting embodiments, the anchoring does not result in covalent attachment of the one or more inserted monoliths 103 and the walls of the one or more channels 102.

Due to their controllable porosity and high surface area, porous polymer monoliths 103 may be able to eliminate voids and achieve high bond strength between the channel walls and monolith surfaces and, thus, ensure predictable and uniform flow through the porous monolith structures. Compared with traditional in situ monolith fabrication, the solvent-assisted integration of one or more ex situ fabricated monoliths 103 provides excellent monolith to channel substrate 101 and capping layer 104 anchoring (e.g., monolith-COC anchoring) due to mechanical interlocking between the materials. The example of the interface between the monolith 103 and channel wall following bonding illustrated in FIG. 15 reveals the morphology of the interlocking materials.

Figure 16A:
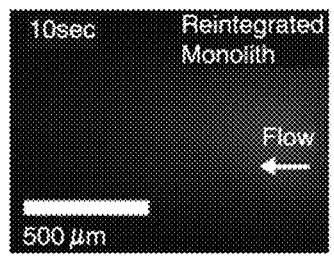
FIGS. 16A-16C are fluorescence images of a fluorescein solution being pumped through an ex situ fabricated bare porous polymer monolith integrated in a channel of a fluidic chip embodying aspects of the present invention at different times.
Figure 16B:
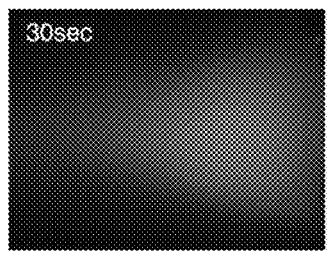
Figure 16C:
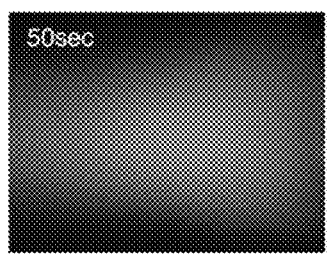
Figure 17A:
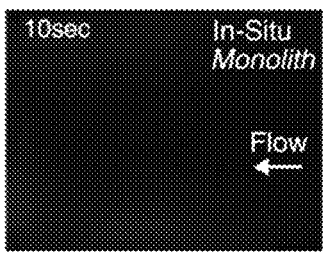
FIGS. 17A-17C are fluorescence images of a fluorescein solution being pumped through a porous polymer monolith formed in situ in a channel of a fluidic chip.
Figure 17B:
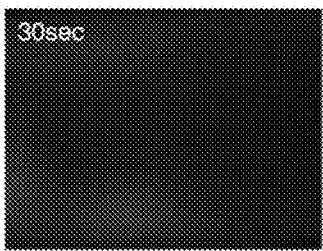
Figure 17C:
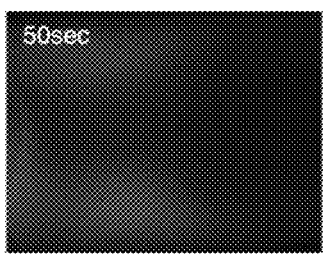
Figure 16D:
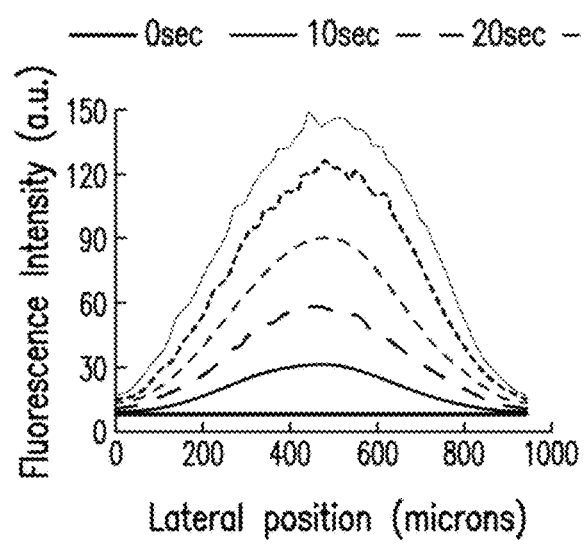
FIG. 16D is a graph illustrating fluorescence intensity profiles at the different times for the ex situ fabricated bare porous polymer monolith integrated in the channel embodying aspects of the present invention.
Figure 17D:
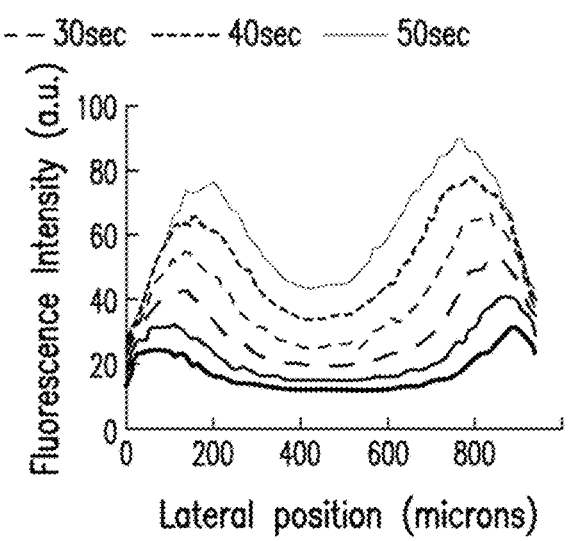
FIG. 17D is a graph illustrating fluorescence intensity profiles at the different times for the porous polymer monolith formed in situ in the channel.

To evaluate the quality of the interface, a dilute fluorescein solution was pumped at 2 µl/min for 5 min to 10 min through an ex parte fabricated integrated trapezoidal monolith 103 as well as a trapezoidal monolith formed in situ within an identical channel. Care was taken to produce monoliths of similar lengths (approximately 2 mm) for each case. FIGS. 16A-16C are fluorescence images of the fluorescein solution being pumped through an ex situ fabricated bare trapezoidal porous polymer monolith 103 integrated in a trapezoidal channel 102 of a fluidic chip 100 at different times. FIG. 16D is a graph illustrating fluorescence intensity profiles at the different times for the ex situ fabricated bare porous polymer monolith 103 integrated in the channel 102. FIGS. 17A-17C are fluorescence images of a fluorescein solution being pumped through a trapezoidal porous polymer monolith formed in situ in a trapezoidal channel of a fluidic chip. FIG. 17D is a graph illustrating fluorescence intensity profiles at the different times for the porous polymer monolith formed in situ in the channel.

As shown in FIGS. 16A-16D, flow through the ex situ fabricated integrated monolith 103 occurs within the bulk porous matrix, with uniform fluorescence intensity that matches well with the trapezoidal cross-section of the monolith 103. In contrast, as shown in FIGS. 17A-17D, flow through the in situ monolith occurs primarily at the monolith-microchannel interface, indicating the presence of extensive voids between the materials that result in a non-uniform flow profile and prevent significant flow through the core of the porous structure. The ex situ integration technique in which one or more ex situ fabricated monoliths 103 are mechanically attached to channel walls of a fluidic device 100 allows for very short lengths of large cross-section monolith with excellent sealing at the interface between the monolith 103 and the walls of the channel 102, eliminating voids which would otherwise allow fluidic bypass and sample loss.

One application of microfluidic monoliths that holds particular promise is in the area of optofluidic sensing, where the porous monolith matrix may serve as a functionalized volumetric detection zone capable of enhancing local analyte concentration and detection sensitivity. See, e.g., K. Jiang, A. Sposito, J. Liu et al., *Microfluidic synthesis of macroporous polymer immunobeads*, Polymer, vol. 53, no. 24, pp. 5469-5475, November 2012. In some non-limiting embodiments, the process 300 (see FIG. 3) for incorporating one or more ex situ fabricated porous polymer monoliths 103 into a fluidic chip 100 may be used to create optofluidic sensor, such as, for example, a fluorescent immonosensor.

In some non-limiting embodiments, the process 300 (see FIG. 3) for incorporating one or more ex situ fabricated porous polymer monoliths 103 into a fluidic chip 100 may incorporate an array of porous polymer monoliths 103 with different chemical or biochemical functionalities within a single fluidic chip 100, which may enable multiplexed detection of different analytes within a single sample. Known strategies for the integration of arrays of porous or 3-dimensional detection elements into microfluidic chips including (i) integration of discrete functionalized capillary segments, see, e.g., H. Hisamoto et al., *Capillary-assembled microchip for universal integration of various chemical functions onto a single microfluidic device*, Analytical chemistry, vol. 76, no. 11, pp. 3222-8, June 2004; (ii) patterning of hydrogel micropatches, see, e.g., J. Heo and R. M. Crooks, *Microfluidic biosensor based on an array of hydrogel-entrapped enzymes*, Analytical chemistry, vol. 77, no. 21, pp. 6843-51, November 2005; and (iii) 1-dimensional microbead arrays. See, e.g., H. Zhang et al., *Detection of single-base mutations using 1-D microfluidic beads array*, Electrophoresis, vol. 28, no. 24, pp. 4668-78, December 2007. For the case of porous monoliths, the in situ formation of a multifunctional array within a sealed microchannel is possible, but this approach would require a laborious sequential fabrication process (see K. W. Ro, R. Nayak, and D. R. Knapp, *Monolithic media in microfluidic devices for proteomics*, Electrophoresis, vol. 27, no. 18, pp. 3547-58, September 2006) together with the need for complex flow control to deliver separate functionalization reagents to each array element.

The process 300 (see FIG. 3) may be used to integrate an array of fully functionalized ex situ fabricated monoliths 103 and can avoid the limitations of in situ formation of a multifunctional array, allowing facile construction of arrays of sealed porous polymer monoliths 103 with different functionalities within a single continuous channel 102 or fluidic network. In some non-limiting embodiments that use decalin for solvent bonding, the low volatility of decalin relative to other commonly used solvents may allow the surface (e.g., the COC surface) of the channel substrate 102 to remain softened for up to several minutes following solvent exposure, providing ample time for integration of multiple bare preformed porous polymer monoliths 103 to enable the creation of closely spaced arrays. However, decalin is not required to create monolith arrays, and some alternative embodiments may use other solvents capable of softening the channel substrate surface for a sufficient amount of time. An illustrative example of this capability is presented in FIG. 18, where bare preformed porous polymer monoliths 103a and 103c batch-functionalized with two different fluorescent markers (e.g., a covalently attached rhodamine and a covalently attached IgG-FITC) are placed immediately adjacent to each other within a single channel 102 of a channel substrate 101, with no overlap and minimal buffer space between the monoliths 103a and 103c.

Figure 19A:
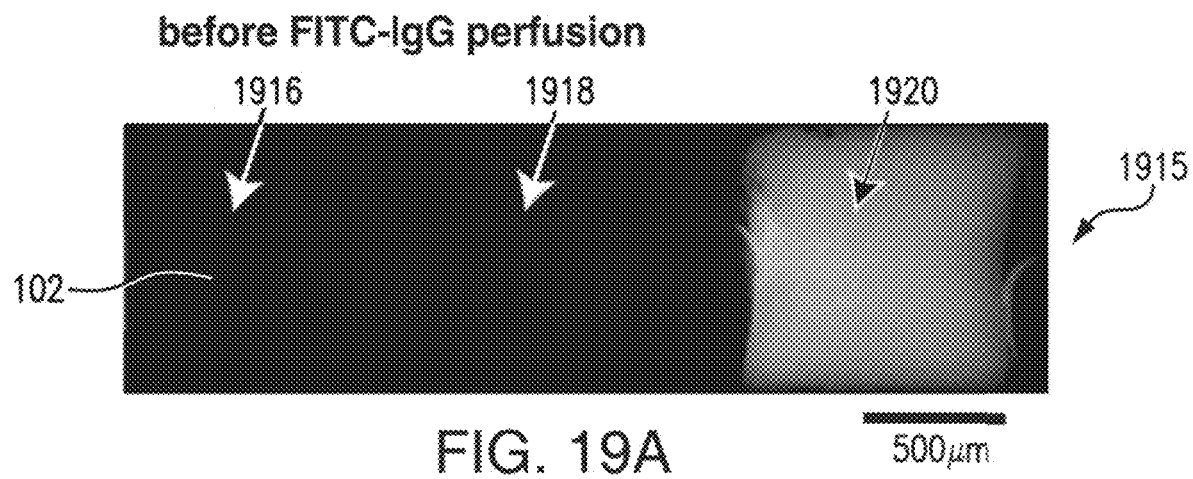
FIGS. 19A and 19B are top view images of a multiple porous polymer monoliths integrated in a channel of a fluidic chip before and after analyte exposure, respectively, embodying aspects of the present invention.
Figure 19B:
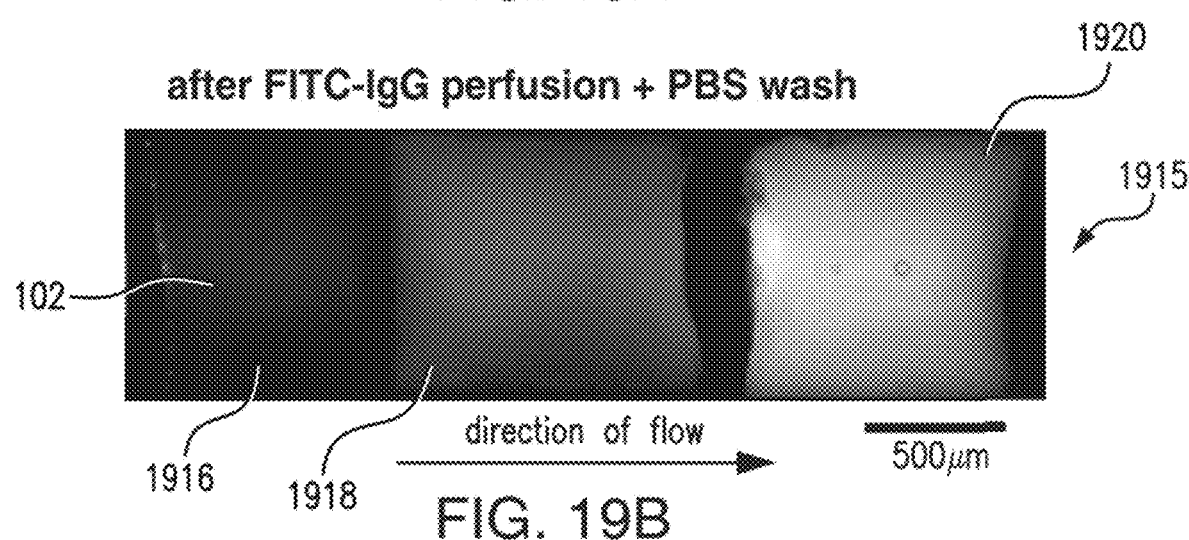

In some non-limiting embodiments, the process 300 (see FIG. 3) may be used to create an immunosensor 1915 capable of realizing a simple flow-through immunoassay. A non-limiting example of the immunosensor 1915 is illustrated in FIGS. 19A and 19B. In some embodiments, the immunosensor 1915 may include a detection element 1918. In some embodiments, the immunosensor 1915 may include one or more of an integrated positive control 1920 and an integrated negative control 1916.

In some non-limiting embodiments, the detection element 1918 may be for detection, for example and without limitation, FITC-IgG, which may be from human serum. In some non-limiting embodiments, the detection element 1918 may be a bare porous polymer monolith 103 functionalized with covalently-attached immunoglobin-binding protein (e.g., covalently-attached protein G). In some non-limiting embodiments, the negative control 1916 may be an unfunctionalized bare porous polymer monolith 103 that is incubated with a protein concentration standard, such as, for example and without limitation, bovine serum albium (BSA). In some embodiments, the negative control 1916 may indicate the extent of non-specific analyte binding. In some non-limiting embodiments, the positive control 1920 may be a bare porous polymer monolith 103 functionalized with covalently-attached conjugate of a fluorescent marker and an immunoglobin (e.g., FITC-IgG). In some embodiments, the positive control 1920 may provide a positive control fluorescence standard against which the fluorescence of detection element 1918 may be compared for quantitative readout.

Figure 19C:
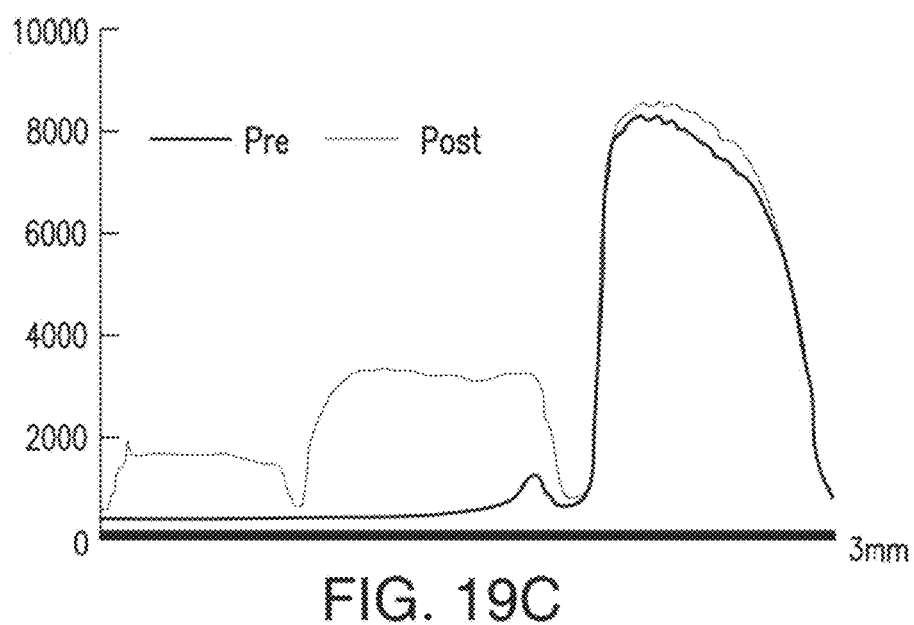
FIG. 19C is a graph illustrating the fluorescence intensity as a function of position in the channel having the multiple porous polymer monoliths integrated therein before and after analyte exposure embodying aspects of the present invention.

FIG. 19A illustrates the immunosensor 1915 before analyte exposure, and FIG. 19B illustrates the immunosensor 1915 after analyte exposure. As illustrated in FIG. 19A, before the analyte, in this case FITC-IgG, is perfused through the channel 102, only the positive control 1920 is visible under fluorescence microscopy using a FITC filter set. As illustrated in FIG. 19B, after a solution of 100 µg/ml FITC-IgG in PBS is perfused through the series of monoliths at 5 µl/min for 20 min, followed by an equal flow rate and volume of rinse buffer, the fluorescence intensity in the negative control 1916 and the detection element 1918 increases. FIG. 19C is a graph illustrating the fluorescence intensity as a function of position in the channel 102 of the immunosensor 1915 (averaged across the channel width) before and after analyte exposure. In some additional embodiments, this concept may be readily extended to include one or more additional porous polymer monoliths 103 functionalized with other capture probes to realize higher levels of multiplexing in a simple flow-through assay.

In some non-limiting embodiments, the process 300 (see FIG. 3) for incorporating one or more ex situ fabricated porous polymer monoliths 103 into a fluidic chip 100 may be used to create a wettability-based bubble separator 2022. A non-limiting example of the wettability-based bubble separator 2022 is illustrated in FIGS. 20A-20F. The formation of unwanted air bubbles is a common challenge for many microfluidic systems, and the process 300 may be used to integrate multiple porous polymer monoliths 103 with different chemistries into a bubble separator 2022 capable of removing trapped air from a channel based on the differential wettability.

In some embodiments, the wettability-based bubble separator 2022 may comprise a T-junction formed by channels 102 of a channel substrate 101. In some embodiments, the channels 102 of the channel substrate 101 may comprise an inlet 2024 of the T-junction, a first downstream branch 2026 of the T-junction, and a second downstream branch 2028 of the T-junction. In some embodiments, the wettability-based bubble separator 2022 may comprise a first monolith 2030 and a second monolith 2032. In some embodiments, the first monolith 2030 may be in the first downstream branch 2026 of the T-junction, may be adjacent to the inlet 2024 of the T-junction, and may comprise a bare porous polymer monolith 103 having a hydrophobic monolith chemistry (e.g., comprising BMA). In some embodiments, the second monolith 2032 may be in the second downstream branch 2028 of the T-junction, may be adjacent to the inlet 2024 of the T-junction, and may comprise a bare porous polymer monolith 103 having a hydrophilic monolith chemistry (e.g., comprising GMA). In some non-limiting embodiments, the first and second monoliths 2030 and 2032 may have approximately the same dimensions (e.g., approximately 1 mm long, 1 mm wide, and 350 µm deep). In some embodiments, the first monolith 2030 may completely fill the first downstream branch 2026 of the T-junction, and the second monolith 2032 may completely fill the second downstream branch 2028 of the T-junction. In some embodiments, the wettability-based bubble separator 2022 may include an air outlet 2034 at an end of the first downstream branch 2026 and a water outlet 2036 at an end of the second downstream branch 2028.

At low inlet pressures, the pores of the hydrophobic first monolith 2030 remain air filled and present a low resistance to gas flow. Likewise, the pores of the hydrophilic second monolith 2032 wet readily and spontaneously fill with water by capillary flow. To test the separator 2022, water was pumped at 5 µl/min through the inlet channel 2024, with air bubbles 2038 introduced using an off-chip flow splitter. One full cycle of water-air-water injection is presented in FIGS. 20A-20F, revealing complete removal of the air bubble 2038 through the hydrophobic first monolith 2030 and an isolated flow of water achieved through the hydrophilic second monolith 2032.

As illustrated in FIG. 20A, an air bubble 2038 may enter the inlet 2024 of the separator 2022, displacing the remaining water at the channel intersection through the hydrophilic second monolith 2032 until, as illustrated in FIG. 20B, the front of the bubble 2038 reaches the hydrophilic second monolith 2032. As illustrated in FIG. 20C, the air bubble 2038 traverses the hydrophobic first monolith 2030 until, as illustrated in FIG. 20D, the trailing edge of the bubble 2038 clears the gap between the first and second monoliths 2030 and 2032. As illustrated in FIGS. 20E and 20F, water 2040 behind the trailing edge of the bubble 2038 re-establishes flow through the hydrophilic second monolith 2032 as the remainder of the air bubble 2038 enters the hydrophobic first monolith 2030.

In the wettability-based bubble separator 2022 example, two different monolith chemistries were used, unlike the multiplexed immunosensor 1915 example, which took advantage of different functionalization paths with a single monolith chemistry. Indeed, driven largely by their use increasing in chromatographic separations, an exceptionally wide range of demonstrated polymer monolith chemistries beyond GMA and BMA, such as those discussed in F. Svec, *Porous polymer monoliths: amazingly wide variety of techniques enabling their preparation*, Journal of chromatography. A, vol. 1217, no. 6, pp. 902-24, February 2010, can be readily adapted to the solvent-assisted integration process. Similarly, a vast array of inorganic metal and oxide monolith chemistries, such as those discussed in Z. Walsh, B. Paull, and M. Macka, *Inorganic monoliths in separation science: a review*, Analytica chimica acta, vol. 750, pp. 28-47, October 2012, many of which require high temperature synthesis that prohibits their integration into thermoplastic microfluidics by in situ fabrication, may be integrated via the solvent-assisted process. Also, the choice of monolith material may not be limited by sidewall anchoring requirements because the solvent-assisted process may employ mechanical interlocking rather than chemistry-specific covalent attachment.

The integration of pre-fabricated monoliths, which may also be pre-functionalized, into microfluidic devices by the solvent-assisted process has the potential to greatly simplify the preparation of a wide variety of fluidic devices. The ex situ integration process may allow porous, high surface area, and both chemically- and functionally-diverse monolith structures to be prepared off chip in a highly parallel batch process, followed by post-synthesis insertion into fully sealed fluidic channels without concern for traditional limits on monolith homogeneity, resolution, and chemical compatibility with the fluidic substrate. The ex situ integration process may allow multiple monolith elements with different surface functionalities or bulk polymer chemistries to be used within a single device, and the concept may be further extended to other monolith materials including inorganic oxides or metals, significantly widening the range of porous materials that may be integrated into thermoplastic microfluidics. While the method has been demonstrated here for immunosensing, bubble removal, and sample purification, the technique can offer wide utility for applications including molecular separation and solid phase extraction, filtration, biosensing, microreaction, and beyond.

In some non-limiting embodiments, the process 300 (see FIG. 3) for incorporating one or more ex situ fabricated porous polymer monoliths 103 into a fluidic chip 100 may be used to create a fluidic chip 2100 capable of pH modulated nucleic acid capture and purification using one or more chitosan functionalized porous polymer monoliths 103. A non-limiting example of the fluidic chip 2100 is illustrated in FIGS. 21A and 21B. FIG. 21A is flat side view of the chitosan functionalized triangular porous polymer monolith 103 in the triangular channel 102 of the channel substrate 101. FIG. 21B is a scanning electron microscope cross-section image of a chitosan functionalized triangular porous polymer monolith 103 in a triangular channel 102 of a channel substrate 101.

In some embodiments, the fluidic chip 2100 may include one or more bare porous polymer monoliths 103. In some embodiments, the one or more bare porous polymer monoliths 103 of the fluidic chip 2100 may be fabricated ex situ in step 301 of the process 300 illustrated in FIG. 3. In some non-limiting embodiments, the one or more bare porous polymer monoliths 103 of fluidic chip 2100 may be fabricated ex situ according to the process 400 illustrated in FIG. 4. In some non-limiting embodiments, the one or more bare porous polymer monoliths 103 of fluidic chip 2100 may comprise GMA.

In some embodiments, one or more bare porous polymer monoliths 103 may be functionalized ex situ in step 302 of the process 300 illustrated in FIG. 3. In some embodiments, the one or more bare porous polymer monoliths 103 may be functionalized by anchoring a molecule (e.g., chitosan) capable of electrostatically driven, pH modulated nucleic acid capture on the one or more monoliths 103.

Some embodiments may employ one of two different approaches for functionalization of porous polymer monoliths 103 with chitosan. In the first approach, a bifunctional cross-linker (e.g., GMBS) may be used to couple amines from the chitosan polymer with epoxy groups on the polymer monolith 103. In some non-limiting embodiments, the bifunctional cross-linker GMBS was used to attach chitosan to the GMA monoliths using an adaptation of a known antibody anchoring procedure. See J. Liu et al., *Flow-through immunosensors using antibody-immobilized polymer monoliths*, Biosens. Bioelectron., vol. 26, no. 1, pp. 182-8, September 2010. The cross-linker approach is effective in generating a dense layer of chitosan on the monolith surface, as determined by nucleic acid capture. However, the cross-linker approach requires a complex multistep reaction process.

In the second approach, chitosan may be anchored to the porous polymer monolith 103 through a direct reaction of the chitosan with the porous polymer monolith 103. The direct attachment approach may avoid the complex multistep reaction process constraint but requires long incubation times. To overcome the limitation imposed by long incubation times required for direct chitosan attachment, large numbers of monolith elements may be manufactured in parallel, functionalized off-chip (i.e., ex situ) in bulk solution, and individually integrated into microfluidic chips. Due to the parallel and bulk nature of this process, the long chitosan incubation time may have little impact on the overall efficiency of the fabrication method. Furthermore, compared with on-chip (i.e., in situ) chitosan attachment using both the cross-linking and direct attachment routes, this off-chip functionalization strategy may avoid clogging of the monolith 103, which was commonly observed during on-chip attachment due to excessive chitosan build-up during active perfusion through the monolith.

In some embodiments, reaction conditions for direct attachment of chitosan may be optimized by varying both reaction time and temperature. In some embodiments, because chitosan has limited solubility at pH 8, the direct attachment method may be performed in an unbuffered solution. In some non-limiting embodiments, a low chitosan concentration (e.g., 1%) in water may be used because higher chitosan concentrations may result in excessive solution viscosity. In some non-limiting direct chitosan attachment embodiments, direct chitosan functionalization of one or more bare porous polymer monoliths 103 was achieved by soaking newly formed, washed monoliths 103 in a 1% solution of chitosan in water and controlling temperature over long reaction times by placing a vial of the monoliths 103 and solution in an oven. FIG. 22 illustrates a direct reaction between a GMA monolith and chitosan.

Testing found DNA capture and elution performance of monoliths functionalized using on-chip crosslinking and off-chip direct reaction to be similar.

In some non-limiting embodiments, one or more chitosan functionalized bare preformed porous polymer monoliths may be integrated in one or more channels 102 of the fluidic chip 2100 in step 303 of the process 300 illustrated in FIG. 3. In some non-limiting embodiments, the one or more chitosan functionalized bare preformed porous polymer monoliths may be integrated according to the process 900 illustrated in FIG. 9.

Figure 23:
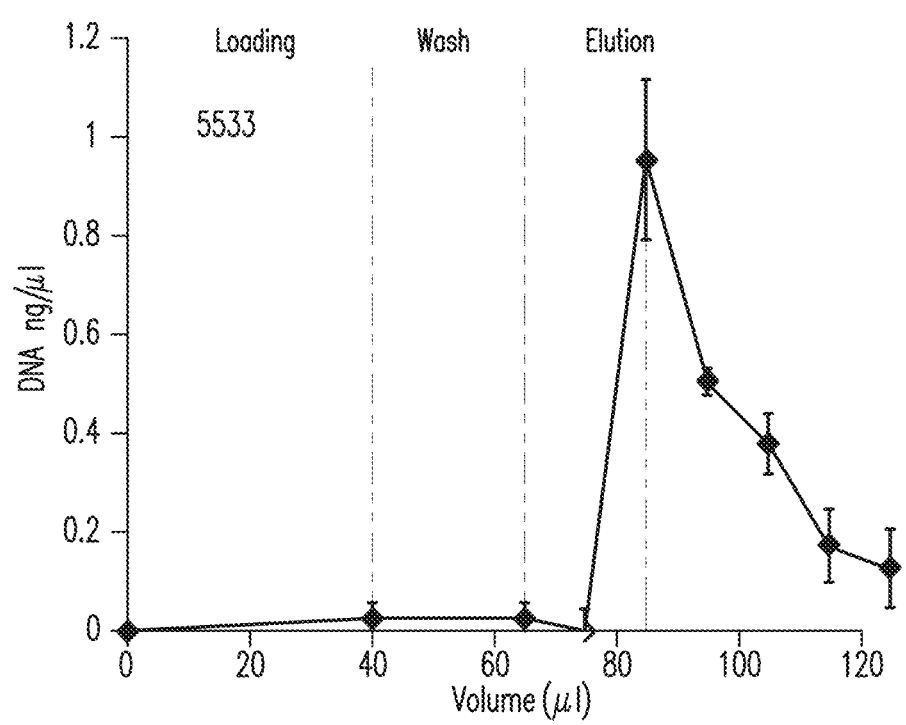
FIG. 23 is a graph illustrating average DNA concentrations at a chip outlet during loading, washing, and elution embodying aspects of the present invention.

In some embodiments, one or more chitosan functionalized monoliths 103 were integrated into channels 102 of a channel substrate 101 of the fluidic chip 2100 and used for DNA capture and recovery. FIG. 23 is a graph illustrating experimental average DNA concentration data in eluent at an outlet of the fluidic chip 2100 during loading (first data point), washing (second data point), and elution (following data points). In the experiment, 40 µl of 1 ng/µl DNA solution was loaded, followed by 30 µl of wash buffer and 60 µl of elution buffer, all at 5 µl/min. As shown in FIG. 23, DNA concentrations at the outlet were negligible during the loading and washing steps, and DNA concentration may reached a peak after approximately 10 microliters of elution buffer have been flushed through the system. Because of the strong pH dependence of Picogreen fluorescence, two separate serial dilutions were prepared to allow quantitation of DNA at pH 5 and at pH 10. The transitional first fraction after switching from pH 5 wash buffer to pH 10 elution buffer represents a potential undercounting of DNA. Using data collected from 3 separate batches of fabricated chips 2100, the chitosan-functionalized monoliths 103 were effective at capturing and releasing DNA, with an average capture efficiency is greater than 99% and an average recovery efficiency of 54.2±14.2%.

Figure 24:
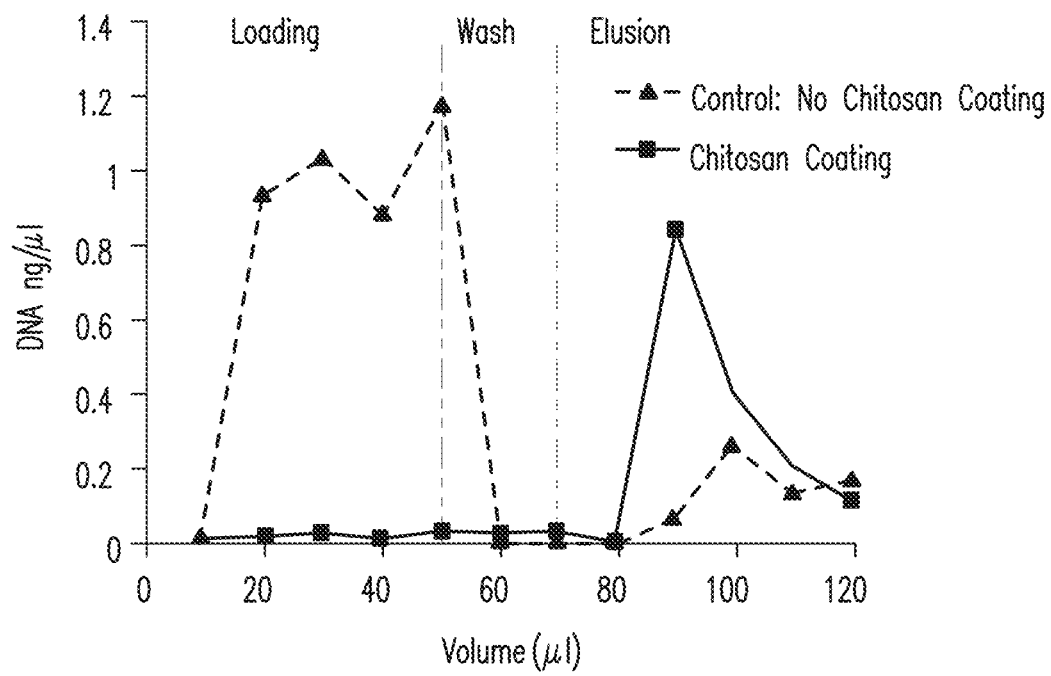
FIG. 24 is a graph showing a comparison between outlet DNA concentration for a control monolith and chitosan coated monolith during the capture, wash and elution of 40 ng of DNA.

To ensure that DNA capture results from the chitosan modified monolith surface, rather than physical or chemical interactions with the GMA monolith itself, native monoliths without surface modification were used as controls. A particular concern was that DNA might become trapped between small submicron gaps formed at the interface between adjacent polymer nodules within the porous monolith matrix, resulting in physical retention of DNA within the matrix. FIG. 24 is a graph showing a comparison between outlet DNA concentration for a control monolith 103 and chitosan coated monolith 103 during the capture, wash and elution of 40 ng of DNA. As shown in FIG. 24, approximately 10% of the DNA was retained in the control monolith 103 during loading and washing at pH 5. All of this DNA is recovered in the elution buffer, confirming that the captured DNA is not physically trapped within the porous matrix. Loading DNA into a control monolith at high pH resulted in no measurable retention. Thus, while bare, unfuctionalized GMA monolith does exhibit weak pH dependent DNA capture capability, these tests demonstrate that the addition of a layer of chitosan is desirable for capturing a significant percentage of the DNA in solution.

Figure 25:
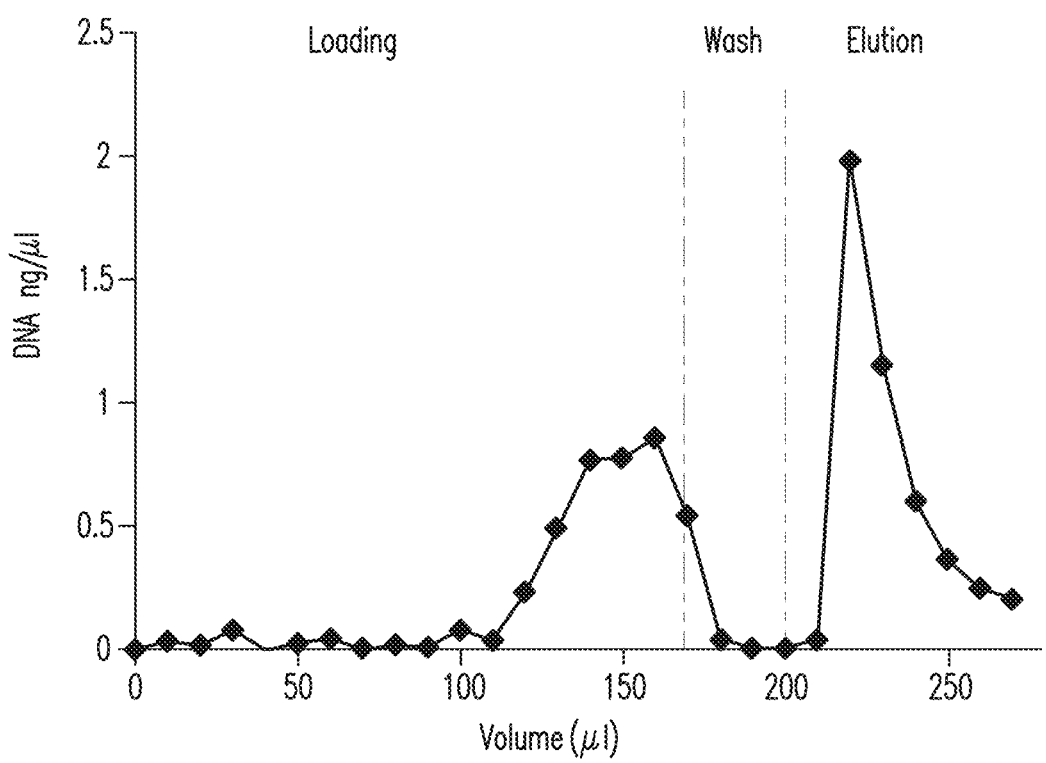
FIG. 25 is a graph showing DNA capture capacity of the non-limiting sample of a chitosan functionalized monolith embodying aspects of the present invention.

The maximum DNA loading capacity of a non-limiting sample of a chitosan functionalized monolith 103 having a length of 1 mm and occupying 300 nl of channel volume was determined by pumping a solution of 1 ng/µl DNA at pH 5 through the sample monolith at 5 µl/min while collecting the eluent in 10 microliter fractions. FIG. 25 is a graph showing DNA capture capacity measurement of the non-limiting sample of the chitosan functionalized monolith 103. The DNA capture capacity was tested by loading 160 µl of 1 ng/µl DNA solution, followed by 30 µl of washing buffer, and 70 µl elution buffer, all at a rate of 5 µl/min. The capture capacity of the sample monolith 103 was reached at approximately 110 ng, and the concentration of DNA in the eluent rose to match the inlet concentration. After washing, approximately 40% of the captured DNA was eluted in a sharp peak with an elevated concentration.

As shown in FIG. 25, the concentration of DNA in the eluent remained negligible until the capture capacity of the sample monolith 103 was reached, after which it rose to match the inlet concentration over the course of several fractions. A total of 110 ng DNA is captured before unbound analyte was observed to pass through the monolith during further loading. Of the DNA bound to the monolith, approximately 40% was recovered after switching to the elution buffer. The eluted DNA was amplifiable by PCR in all cases and quantitative PCR measurements agreed well with fluorescence assays.

Figure 26:
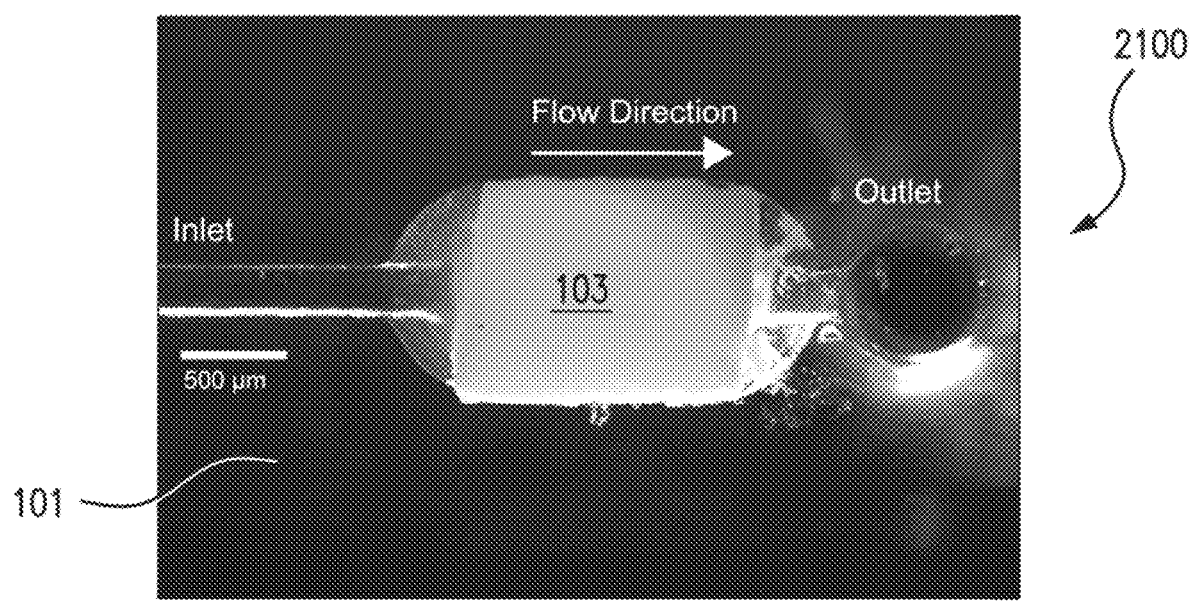
FIG. 26 illustrates monolith-bound DNA visualized with intercalating dye in a fluidic chip embodying aspects of the present invention.

Any DNA not accounted for in the eluent is assumed to remain within the monolith, bound to the chitosan coated surface, where it may be visualized with a DNA intercalating dye as shown in FIG. 26. Reversal of flow through a monolith after completion of the initial elution phase yielded negligible free DNA, implying that the remaining DNA is not merely physically trapped at the upstream end of the monolith, but rather tightly bound to the surface even after charge switching.

The test results shown in FIGS. 23-25 validate a simple, direct chitosan attachment approach to charge-switch based nucleic acid capture and purification using discrete integrated porous monoliths that can be batch functionalized off-chip, followed by integrating individual monoliths into channels (e.g., thermoplastic microchannels) using standard device bonding protocols based on solvent bonding. The high surface area to volume ratio and large cross-sectional area to length ratio of the chitosan coated porous polymer monoliths 103 allows for exceptionally high DNA capture capacity and efficient release in a small on-chip footprint and without introducing significant hydrodynamic resistance for effective flow-through operation. Because the total active surface area is defined by the volume of monolith used, this technique can be tailored to extract and release specific quantities of nucleic acid from a microfluidic fluid stream by defining only the length of monolith inserted. The flexibility and simplicity offered by the monolith-enabled method may realize effective nucleic acid capture, purification, and controlled release in, for example, thermoplastic micro total analysis systems using a highly manufacturable process. The direct chitosan attachment approach also avoids the increased complexity and cost of the overall fabrication process associated with conventional methods for in-line nucleic acid cleanup in fluidic systems that require on-chip functionalization of the capture surfaces.

Embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

What is claimed is:

1. A fluidic chip comprising:
a channel substrate including one or more channels;
two or more bare porous polymer monoliths of differing porosity mechanically sealed to walls of a channel of the channel substrate, wherein the two or more bare porous polymer monoliths are fabricated ex situ in a mold and subsequently inserted into the one or more channels;
wherein at least one of the two or more monoliths comprises a chemically functionalized porous polymer monolith, wherein the chemical functionalization comprises immobilized capture probes.

2. The fluidic chip of claim 1, wherein the immobilized capture probes comprise antibodies, proteins, aptamers, amino acids, peptides, or synthetic capture probes.

3. The fluidic chip of claim 1, wherein the immobilized capture probes are labeled with fluorescent markers.

4. The fluidic chip of claim 1, wherein the immobilized capture probes are chitosan.

5. The fluidic chip of claim 4, wherein the chitosan is immobilized on one or more porous polymer monoliths using a bifunctional cross-linker.

6. The fluidic chip of claim 4, wherein the chitosan is immobilized through a direct reaction of the chitosan with one or more porous polymer monoliths.

7. The fluidic chip of claim 1, further comprising a capping layer bonded to the channel substrate, wherein the one or more monoliths are sealed within the one or more channels of the channel substrate between the channel substrate and the capping layer.

8. The fluidic chip of claim 1, wherein the channel substrate is a thermoplastic substrate.

9. The fluidic chip of claim 1, wherein the channel substrate comprises cyclic olefin copolymer.

10. The fluidic chip of claim 1, wherein the one or more channels of the channel substrate have a triangular or trapezoidal cross-section.

11. The fluidic chip of claim 1, wherein the one or more monoliths have a triangular or trapezoidal cross-section.

12. The fluidic chip of claim 1, wherein the one or more monoliths have cross-sectional dimensions larger than the cross-sectional dimensions of the one or more channels.

13. The fluidic chip of claim 1, wherein the one or more monoliths are oversized relative to the one or more channels.

14. The fluidic chip of claim 1, wherein the two or more bare porous polymer monoliths comprise:
a first monolith in a channel of the one or more channels of the channel substrate; and
a second monolith in the channel of the one or more channels of the channel substrate.

15. The fluidic chip of claim 14, wherein the first monolith has a first functionalization, the second monolith has a second functionalization, and the first functionalization is different than the second functionalization.

16. The fluidic chip of claim 15, wherein the first and second monoliths are functionalized with different fluorescent markers.

17. The fluidic chip of claim 14, wherein the first monolith comprises a first monolith chemistry, the second monolith comprises a second monolith chemistry, and the first monolith chemistry and the second monolith chemistry are different.

18. The fluidic chip of claim 17, wherein the first monolith chemistry is hydrophilic, and the second monolith chemistry is hydrophobic.

19. The fluidic chip of claim 14, wherein the first monolith is un-functionalized, and the second monolith is functionalized.

20. The fluidic chip of claim 19, wherein the two or more bare porous polymer monoliths further comprise a third monolith in the channel of the one or more channels of the channel substrate, the second monolith is functionalized with covalently-attached immunoglobin-binding protein, and the third monolith is functionalized with a covalently-attached fluorescent marker and immunoglobin conjugate.

21. The fluidic chip of claim 1, wherein:
the one or more channels of the channel substrate comprise an inlet of a T-junction, a first downstream branch of the T-junction, and a second downstream branch of the T-junction;
the two or more bare porous polymer monoliths comprise first and second monoliths;
the first monolith is in the first downstream branch of the T-junction, is adjacent to the inlet of the T-junction, and comprises a hydrophobic monolith chemistry; and
the second monolith is in the second downstream branch of the T-junction, is adjacent to the inlet of the T-junction, and comprises a hydrophilic monolith chemistry.

22. The fluidic chip of claim 21, wherein the first monolith comprises butylmethacrylate, and the second monolith comprises glycidyl methacrylate.

23. The fluidic chip of claim 1, wherein the one or more channels have one or more of a width and a height within a range greater than or equal to 10 micrometers and less than or equal to 1 centimeter.

24. The fluidic chip of claim 23, wherein the one or more channels have one or more of a width and a height within a range greater than or equal to 1 millimeter and less than or equal to 1 centimeter.

25. The fluidic chip of claim 23, wherein the one or more channels have one or more of a width and a height within a range greater than or equal to 100 micrometers and less than or equal to 1 millimeter.

26. The fluidic chip of claim 23, wherein the one or more channels have one or more of a width and a height within a range greater than or equal to 10 micrometer and less than or equal to 100 micrometers.

27. The fluidic chip of claim 1, wherein the one or more monoliths have a length within a range greater than or equal to 10 micrometers and less than or equal to 1 centimeter.

28. The fluidic chip of claim 27, wherein the one or more monoliths have a length within a range greater than or equal to 1 millimeter and less than or equal to 1 centimeter.

29. The fluidic chip of claim 27, wherein the one or more monoliths have a length within a range greater than or equal to 100 micrometers and less than or equal to 1 millimeter.

30. The fluidic chip of claim 27, wherein the one or more monoliths have a length within a range greater than or equal to 10 micrometer and less than or equal to 100 micrometers.

* * * * *